US012751357B2

(12) United States Patent
Cao et al.

(10) Patent No.: US 12,751,357 B2
(45) Date of Patent: Oct. 6, 2026

(54) MOWER AND HEIGHT ADJUSTMENT METHOD OF MOWER

(71) Applicant: Greenworks (Jiangsu) Co., Ltd, Changzhou (CN)

(72) Inventors: Jin Cao, Changzhou (CN); Jie Gao, Changzhou (CN); Wanghao Li, Changzhou (CN); Zhigao Pu, Changzhou (CN); Jimmy Alzén, Gränna (SE)

(73) Assignee: Greenworks (Jiangsu) Co., Ltd, Changzhou (CN)

( * ) Notice: Subject to any disclaimer, the term of this patent is extended or adjusted under 35 U.S.C. 154(b) by 299 days.

(21) Appl. No.: 18/641,487

(22) Filed: Apr. 22, 2024

(65) Prior Publication Data

US 2024/0268263 A1 Aug. 15, 2024

Related U.S. Application Data

(63) Continuation of application No. PCT/CN2022/127276, filed on Oct. 25, 2022.

(30) Foreign Application Priority Data

| | | |
|---|---|---|
| Oct. 28, 2021 | (CN) | 202111267827.5 |
| Oct. 28, 2021 | (CN) | 202122607246.3 |
| Nov. 9, 2021 | (CN) | 202111323544.8 |
| Nov. 9, 2021 | (CN) | 202122739295.2 |
| Nov. 12, 2021 | (CN) | 202111344924.X |
| Nov. 12, 2021 | (CN) | 202122781368.4 |
| Dec. 8, 2021 | (CN) | 202111494153.2 |
| Dec. 8, 2021 | (CN) | 202111494155.1 |

(51) Int. Cl.
*A01D 34/74* (2006.01)
*A01D 34/00* (2006.01)

(52) U.S. Cl.
CPC .......... *A01D 34/74* (2013.01); *A01D 34/008* (2013.01)

(58) Field of Classification Search
CPC ....... A01D 34/74; A01D 34/008; A01D 75/20
See application file for complete search history.

(56) References Cited

U.S. PATENT DOCUMENTS

| | | | | |
|---|---|---|---|---|
| 3,670,316 A * | 6/1972 | Matthews | G05D 3/20<br>360/78.04 |
| 4,152,588 A * | 5/1979 | Klatt | G02B 26/10<br>250/237 G |
| 2018/0303026 A1* | 10/2018 | Pellenc | A01D 34/78 |
| 2021/0274704 A1* | 9/2021 | Song | A01D 34/74 |

* cited by examiner

*Primary Examiner* — Brad Harcourt

(57) ABSTRACT

The disclosure relates to a mower and a height adjustment method of the mower. The mower includes a casing, a cutting device, a height adjustment mechanism, a sensing assembly and a control unit. The cutting device is arranged on the casing. The height adjustment mechanism drives the cutting device to move along a height adjustment direction relative to the casing. The sensing assembly includes a corresponding optical grating structure and a first sensor. The optical grating structure includes hollow parts and blocking parts distributed alternately, and the first sensor includes a first signal receiver and a first signal transmitter. The control unit controls the height adjustment mechanism to adjust a height according to a number of times the first signal is blocked. Wherein, one of the optical grating structure and the first sensor is directly or indirectly arranged on the cutting device.

18 Claims, 26 Drawing Sheets

MOWER AND HEIGHT ADJUSTMENT METHOD OF MOWER

CROSS REFERENCE TO RELATED APPLICATION

The present application is a continuation Application of PCT application No. PCT/CN2022/127276 filed on Oct. 25, 2022, which claims the benefit of CN202111267827.5 filed on Oct. 28, 2021, CN202122607246.3 filed on Oct. 28, 2021, CN202111323544.8 filed on Nov. 9, 2021, CN202122739295.2 filed on Nov. 9, 2021, CN202111344924.X filed on Nov. 12, 2021, CN202122781368.4 filed on Nov. 12, 2021, CN202111494155.1 filed on Dec. 8, 2021, and CN202111494153.2 filed on Dec. 8, 2021. All the above are hereby incorporated by reference for all purposes.

TECHNICAL FIELD

The disclosure relates a technical field of mowers, especially relates to a mower and a height adjustment method of the mower.

BACKGROUND

Mowers are mechanical tools used to mow lawns, vegetation, etc., which may effectively improve the weeding efficiency of workers and reduce the labor intensity of workers. However, different users have different requirements for the height of the lawn. For this reason, mowers that may adjust the mowing height have appeared on the market one after another, allowing users to freely select the mowing height and thereby control the height of the lawn after mowing.

The conventional mowers mostly adopt the manual height adjustment device of purely mechanical structure to realize the mowing height adjustment, which needs to manually adjust the mowing height, influences the user experience, and is not intelligent enough. There are also mowers that may automatically adjust the height, but the conventional automatic height adjustment devices are complex in structure, and the cost is high.

SUMMARY

The disclosure provides a mower and a height adjustment method of the mower, and provides an improved mower to solve a problem that a height adjustment of the mower needs to rely on manual adjustment in the present art.

The disclosure provides the mower. The mower includes a casing, a cutting device, a height adjustment mechanism, a sensing assembly and a control unit.

The cutting device is arranged on the casing and provided with a cutting disc.

The height adjustment mechanism drives the cutting device to move along a height adjustment direction relative to the casing.

The sensing assembly is configured to detect a height adjustment distance of the cutting device relative to the casing in the height adjustment direction, and includes a corresponding optical grating structure and a first sensor. The optical grating structure includes hollow parts and blocking parts distributed alternately. The first sensor includes a first signal receiver and a first signal transmitter, and a first signal between the first signal transmitter and the first signal receiver is periodically blocked during height adjustment.

The control unit is configured to control the height adjustment mechanism to adjust a height according to a number of times the first signal being blocked.

Wherein, one of the optical grating structure and the first sensor is directly or indirectly arranged on the cutting device, and the other one of the optical grating structure and the first sensor is directly or indirectly arranged on the casing.

In some embodiments, the height adjustment mechanism further includes a cutting frame, a height adjustment motor and a transmission structure.

The cutting device is arranged on the cutting frame and provided with a cutting motor to drive the cutting disc to perform a cutting, and the cutting frame is mounted in a sliding passage of the casing.

The height adjustment motor is fixedly connected with the casing.

The transmission structure connects the height adjustment motor with the cutting frame, configured to convert a rotation motion output by the height adjustment motor into a linear motion of the cutting frame along the sliding passage, and the height adjustment motor drives the cutting frame to adjust the height.

Wherein, one of the optical grating structure and the first sensor is arranged on the cutting frame.

In some embodiments, the optical grating structure is strip-shaped, and each hollow part and each blocking part of the optical grating structure are alternately arranged along the height adjustment direction, wherein, the optical grating structure is arranged on the cutting frame, and the first sensor is arranged on the casing.

In some embodiments, the optical grating structure is strip-shaped, and each hollow part and each blocking part of the optical grating structure are alternately arranged along the height adjustment direction, wherein, the optical grating structure is arranged on the casing, and the first sensor is arranged on the cutting frame.

In some embodiments, there are two first sensors, and the two first sensors are arranged along a length direction of the optical grating structure.

In some embodiments, the hollow parts and the plurality of blocking parts in the optical grating structure have a same size.

In some embodiments, the optical grating structure is connected with the height adjustment motor and rotates with the height adjustment motor, and each hollow part and each blocking part of the optical grating structure are alternately, evenly and circumferentially distributed on the optical grating structure.

In some embodiments, the height adjustment mechanism is further correspondingly provided with a height adjustment limiting structure configured to limit a minimum cutting height and a highest cutting height of the cutting device.

In some embodiments, the height adjustment limiting structure includes a micro switch and a triggering component to trigger the micro switch, wherein, one of the micro switch and the triggering component is arranged on the cutting frame, and one of the micro switch and the triggering component is arranged on the casing.

The triggering component is configured to trigger the micro switch to stop the height adjustment motor when the cutting frame is adjusted to a highest distance from the ground or a lowest distance from the ground.

In some embodiments, the triggering component includes a triggering component body, a high-level triggering part protruding on the triggering component body and a low-level triggering part protruding on the triggering component body. The high-level triggering part and the low-level triggering part are arranged at intervals along a height direction, and an avoidance space is formed between the high-level triggering part and the low-level triggering part.

When the micro switch moves to a position corresponding to the avoidance space, the micro switch is spaced from the triggering component, and the micro switch is in a non-triggering state.

When the cutting frame is located at position with a highest distance from the ground, the high-level triggering part contacts and triggers the micro switch. When the cutting frame is located at position with a lowest distance from the ground, the low-level triggering part contacts and triggers the micro switch.

In some embodiments, the high-level triggering part is provided with a high-level triggering surface facing the micro switch, and the low-level triggering part is provided with a low-level triggering surface facing the micro switch. A spacing surface facing the avoidance space is arranged on the triggering component body, and the spacing surface is separated from the micro switch by the avoidance space. A transition between the high-level triggering surface and the spacing surface is through a first transition slope, and a transition between the low-level triggering surface and the spacing surface is through a second transition slope.

In some embodiments, the casing is provided with a first limiting groove, a bottom of the triggering component is inserted into the first limiting groove, an upper end of the triggering component is provided with an elastic clamping arm, and the casing is provided with a clamping groove for the elastic clamping arm to be clamped into.

In some embodiments, the casing is provided with a limiting vertical plate, the limiting vertical plate blocks one side of the triggering component facing away from the micro switch. A clamping plate is arranged above the limiting vertical plate, and the clamping groove is formed between a bottom of the clamping plate and a top of the limiting vertical plate.

An end part of the elastic clamping arm is provided with a first limiting part, the elastic clamping arm passes through the clamping groove, and the clamping plate is clamped with the first limiting part.

In some embodiments, the clamping plate is parallel to the limiting vertical plate, and is located at an outside of limiting vertical plate.

In some embodiments, a height-position limiting assembly further includes a mounting base connected with the cutting frame, and the micro switch is detachably mounted on the mounting base.

In some embodiments, the mounting base is provided with a plug-in cavity and an elastic snapping arm, the micro switch is arranged in the plug-in cavity, and the elastic snapping arm is provided with a second limiting part for limiting the micro switch in the plug-in cavity.

In some embodiments, the height adjustment limiting structure includes a light blocking piece and a second sensor, the light blocking piece includes an intercepting portion located at the highest cutting height, an intercepting portion located at the lowest cutting height and a hollow portion located between the two intercepting portions, and the intercepting portion is configured to block a signal of the second sensor.

One of the light blocking piece and the second sensor is arranged on the cutting frame, and one of the light blocking piece and the second sensor is arranged on the casing.

In some embodiments, the mower further includes a shock absorbing mechanism and a guiding mechanism.

The shock absorbing mechanism includes a shock absorbing base, a first elastic deformation part arranged on the shock absorbing mechanism and a second elastic deformation part arranged on the shock absorbing mechanism.

The guiding mechanism is connected with the shock absorbing mechanism, and the guiding mechanism and the shock absorbing mechanism is capable of sliding relative along the height adjustment direction of the cutting frame. One of the shock absorbing mechanism and the guiding mechanism is arranged on the cutting frame, and the other one of the shock absorbing mechanism and the guiding mechanism is arranged on the casing.

Wherein, the first elastic deformation part is elastically abutted against the guiding mechanism to limit a swing and tilt of the cutting frame relative to the height adjustment direction, and the second elastic deformation part is elastically abutted against the guiding mechanism to limit a shaking of the cutting frame in a radial direction.

In some embodiments, the cutting frame is provided with a mounting groove, the guiding mechanism is mounted in the mounting groove, and the shock absorbing mechanism is arranged on the casing. Or the shock absorbing mechanism is mounted in the mounting groove, and the guiding mechanism is arranged on the casing.

In some embodiments, the guiding mechanism includes a guiding base, and two guiding plates are relatively arranged on the guiding base. A guiding groove along the height adjustment direction is formed between the two guiding plates, and the first elastic deformation part of the shock absorbing mechanism stretches into the guiding groove and abuts against an inner wall of the guiding plate.

In some embodiments, the first elastic deformation part includes two first elastic plates that are arranged oppositely. A first end of the first elastic plate is connected with the shock absorbing base, and a second end of the first elastic plate is a suspended end. The suspended end of the first elastic plate stretches into the guiding groove and abuts against the inner wall of the guiding plate outward.

In some embodiments, the suspended end of the first elastic plate is provided with a first protrusion protruding in a direction where the guiding plate is located, and the first protrusion is provided with an arc-shaped surface in contact with the inner wall of the guiding plate.

In some embodiments, one side of the guiding plate close to the shock absorbing mechanism is provided with a guiding surface for guiding the first elastic deformation part to stretch into the guiding groove.

In some embodiments, the guiding base is provided with a limiting part that protrudes toward the shock absorbing mechanism. The limiting part is located between the two guiding plates, and the second elastic deformation part of the shock absorbing mechanism abuts against on the limiting part along a radial direction of the cutting frame.

In some embodiments, the second elastic deformation part includes two second elastic plates that are arranged oppositely. A first end of the second elastic plate is connected with the shock absorbing base, and a second end of the second elastic plate is suspended and bent relative to the first end of the second elastic plate. A suspended end of the second elastic plate abuts against the limiting part.

In some embodiments, bending directions of the two second elastic plates are opposite to each other or opposite to a back of each other.

In some embodiments, the suspended end of the second elastic plate is provided with a second protrusion protruding in a direction where the limiting part is located, and the second protrusion is provided with an arc-shaped surface in contact with the limiting part.

In some embodiments, the limiting part is formed by an arching of the guiding base in a direction where the shock absorbing mechanism is located.

In some embodiments, the transmission structure includes a transmission rod and a transmission part.

In some embodiments, the transmission rod is capable of being driven by the height adjustment motor to rotate.

The transmission part is arranged on the cutting frame and provided with a screw hole.

Wherein, the transmission rod penetrates through the screw hole, and is threaded with the screw hole.

In some embodiments, the transmission structure further includes a driving gear and a driven gear.

The driving gear is connected with the height adjustment motor.

The driven gear is coaxially fixed with the transmission rod.

Wherein, the driven gear meshed with the driving gear.

In some embodiments, the height adjustment mechanism includes the height adjustment motor, the cutting frame and a height adjustment rotating drum.

The height adjustment motor is fixed on the casing.

The cutting frame is mounted in the sliding passage of the casing, and the cutting device is arranged on the cutting frame and acts with the cutting frame.

The height adjustment rotating drum is connected with the height adjustment motor, and the height adjustment rotating drum is sleeved with the cutting frame.

Wherein, a spiral guiding structure that climbs along an axial spiral direction is arranged between the cutting frame and the height adjustment rotating drum. When the height adjustment motor drives the height adjustment rotating drum to rotate in a first direction, the height adjustment rotating drum drives the cutting frame to slide axially along the sliding passage.

In some embodiments, when the height adjustment motor drives the height adjustment rotating drum to rotate in the first direction, after the cutting frame slides and is lifted to exceed a highest position, the cutting frame is lowered to a lowest position.

In some embodiments, the casing is provided with a guiding component, the sliding passage is formed inside the guiding component, and an anti-rotation guiding structure is arranged between the guiding component and the height adjustment rotating drum. A one-way locking component is further arranged between the guiding component and the casing, and the one-way locking component has an unlocking state and a locking state.

When the height adjustment rotating drum rotates in the first direction, the one-way locking component is in the locking state, the guiding component is relatively fixed with the casing, and the cutting frame slides axially along the sliding passage.

When the height adjustment rotating drum rotates in the second direction, the one-way locking component is in the unlocking state, the guiding component can rotate relative to the casing, and the cutting frame and the guiding component rotate with the cutting frame simultaneously.

In some embodiments, the spiral guiding structure includes ratchet teeth and a pawl.

The ratchet teeth are arranged on the height adjustment rotating drum, and the ratchet teeth spiral upward along an axial direction of the height adjustment rotating drum.

The pawl is arranged on the cutting frame, and the pawl is matched with the ratchet teeth.

When the height adjustment motor drives the height adjustment rotating drum to rotate in the first direction, the pawl climbs along a spiral direction of the ratchet teeth to enable the cutting frame rise along its axial direction.

When the height adjustment motor drives the height adjustment rotating drum to rotate in the second direction, the pawl is buckled with the ratchet teeth to enable the cutting frame to rotate in the second direction.

In some embodiments, when the pawl climbs to a top along the spiral direction of the ratchet teeth, the pawl disengages from the top of the ratchet teeth and falls back to a bottom end of the ratchet teeth.

In some embodiments, the anti-rotation guiding structure includes a limiting rib and a second limiting groove.

The limiting rib is arranged on an outer wall of the cutting frame along the axial direction.

The second limiting groove is arranged on an inner wall of the guiding component along the axial direction, and the second limiting groove is matched with the limiting rib.

In some embodiments, the limiting rib is arranged along a circumferential direction of the cutting frame. The second limiting groove is arranged along a circumferential direction of a sliding ring, and the second limiting groove corresponds to the limiting rib one by one.

In some embodiments, the height adjustment rotating drum includes a drum body and a limiting disc.

An inside of the drum body is hollow, and the ratchet teeth are arranged on an outer wall of the drum body.

The limiting disc is connected with an end of the drum body, an outer diameter of the limiting disc is greater than an outer diameter of the drum body, and an end of the ratchet teeth extends to the limiting disc.

In some embodiments, a bottom of the limiting disc is provided with a second connecting part for connecting the height adjustment motor, the height adjustment motor is arranged in the height adjustment rotating drum, and an output shaft of the height adjustment motor is connected to the second connecting part.

In some embodiments, an interior of the cutting frame is hollow, the height adjustment rotating drum is located inside the cutting frame, and the cutting frame includes a first shaft section and a second shaft section.

The pawl is arranged on an inner wall of the first shaft section.

The second shaft section is connected with an end of the first shaft section, and a diameter of the second shaft section is greater than a diameter of the first shaft section. There is a limiting step arranged between the second shaft section and the first shaft section, and the limiting disc of the height adjustment rotating drum is matched with the limiting step.

The disclosure further provides a height adjustment method of the mower. The height adjustment method includes:

- obtaining a preset height adjustment distance and a starting signal of a height adjustment motor;
- controlling a first signal receiver to continuously receive a first signal, and obtaining an actual height adjustment distance according to a number of times that the first signal is interrupted;

stopping the height adjustment motor if the actual height adjustment distance reaches the preset height adjustment distance.

In some embodiments, a current position of the height adjustment motor is stored and the current position is taken as a relative initial position of a next height adjustment when the height adjustment motor stops running.

In some embodiments, the height adjustment method further includes:

controlling the height adjustment motor to stop running when a triggering component triggers a micro switch, and a cutting device reaching a lowest cutting position or a highest cutting position at this time.

In some embodiments, the height adjustment method further includes:

controlling the height adjustment motor to stop running when a light blocking piece blocks a transmission of a second signal from the second sensor, the cutting device reaching the lowest cutting position or the highest cutting position at this time, wherein, the second sensor is a photoelectric gate sensor.

In some embodiments, the height adjustment method further includes:

storing the current position of the height adjustment motor and taking the current position as an absolute initial position of the height adjustment when the triggering component triggers the micro switch or when the light blocking piece blocks the transmission of the second signal from the second sensor.

In some embodiments, the height adjustment method further includes: each time a height is adjusted, after the height adjustment motor is started, first controlling the height adjustment motor to run, enabling the triggering component to trigger the micro switch or enabling the light blocking piece to block the transmission of the second signal from the second sensor, stopping the height adjustment motor from running, and keeping the current position as the absolute initial position;

then taking the absolute initial position as a base point, starting measuring the number of times the first signal receiver is interrupted in receiving the first signal, and obtaining the actual height adjustment distance.

As mentioned above, the disclosure provides the mower and the height adjustment method of the mower. The disclosure adjusts a distance from a ground of a cutting frame through the height adjustment mechanism, and utilizes the grating mechanism in the sensing assembly to periodically block a signal of the first sensor, so that an actual height adjustment distance can be obtained according to a number of signal interruptions, which not only can realize an automatic height adjustment, but also can realize an accurate control of the height adjustment distance.

PART NUMBER DESCRIPTION

Figure 1:
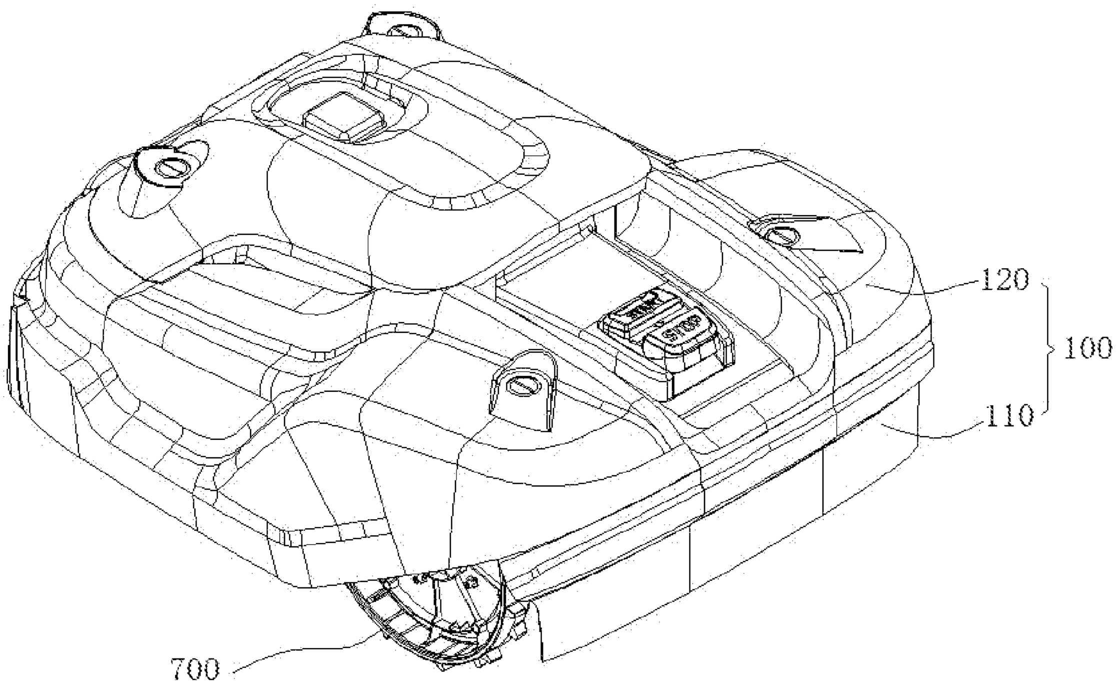
FIG. 1 is an overall schematic structural view of a mower according to at least one embodiment.

100—casing, 110—base, 120—cover, 130—supporting base, 131—sliding passage, 132—limiting vertical plate, 133—clamping plate, 134—first limiting groove, 140—guiding component, 141—second limiting groove, 150—one-way locking component;

200—height adjustment mechanism, 210—cutting frame, 211—mounting groove, 212—first shaft section, 2121—pawl, 213—second shaft section, 2131—limiting rib, 220—height adjustment motor, 230—transmission structure, 231—driving gear, 232—driven gear, 233—transmission rod, 234—transmission part, **234*a*—screw hole, 250—height adjustment rotating drum, 251—drum body, 252—ratchet teeth, 253—limiting disc, 254**—second connecting part;

300—sensing assembly, 310—optical grating structure, 311—hollow part, 312—blocking part, 320—first sensor, 321—first signal receiver, 322—first signal transmitter;

400—height adjustment limiting structure, 410—micro switch, 411—micro switch body, 412—elastic piece, 413—triggering roller, 420—triggering component, 421—triggering component body, 422—low-level triggering part, 423—high-level triggering part, **420*a*—avoidance space, 424—elastic clamping arm, 424*a*—first limiting part, 430—mounting base, 430*a*—plug-in cavity, 430*b*—opening, 431—elastic snapping arm, 431*a*—second limiting part, 440—light blocking piece, 441—intercepting portion, 442—hollow portion, 450—second sensor, 451—second signal transmitter, 452—second signal receiver, 460**—mounting plate;

500—shock absorbing mechanism, 510—shock absorbing base, 511—opening groove, 520—first elastic deformation part, 521—first elastic plate, 5211—first protrusion, 530—second elastic deformation part, 531—second elastic plate, 5311—second protrusion;

600—guiding mechanism, 610—guiding base, 620—guiding plate, 621—guiding surface, 630—limiting part, 640—guiding groove, 650—first connecting part;

700—walking device;

810—cutting motor, 820—cutting disc, 821—cutting blade.

DETAILED DESCRIPTION

The following describes the implementation of the disclosure through specific embodiments, and those skilled in the art can easily understand other advantages and effects of the disclosure from the content disclosed in this specification.

Please refer to FIG. 1 through FIG. 10. It should be noted that the structure, proportion, size, etc. shown in the drawings attached to this specification are only used to cooperate with the contents disclosed in the description for the understanding and reading of persons familiar with the technology, and are not used to limit the limitations that may be implemented by the disclosure, so there is no technical substantive significance. Any structural modifications, changes in proportion, or adjustments in size should still fall within the scope of the technical content disclosed in the disclosure without affecting the effectiveness and purpose of the disclosure. At the same time, it should be noted that the terms such as "upper", "lower", "left", "right", "middle" and "a/an" cited in this specification are only for the convenience of description and are not used to limit the scope of the disclosure. The change or adjustment of the relative relationship should also be regarded as the applicable scope of the disclosure without substantial change in the technical content.

Figure 2:
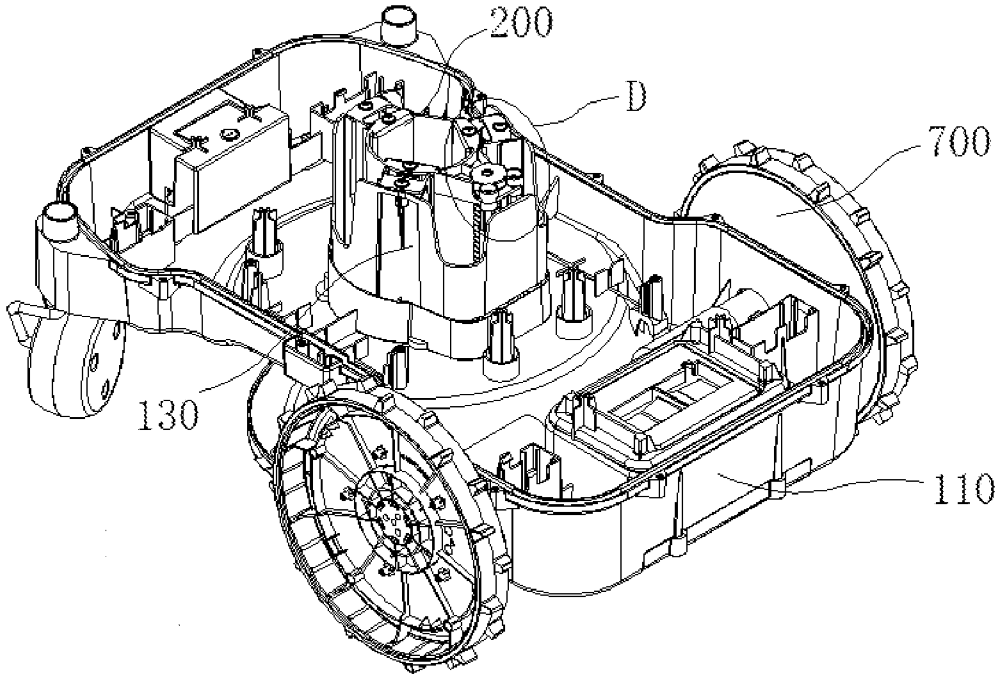
FIG. 2 is a schematic structural view of the mower in FIG. 1 after removing a cover.
Figure 3:
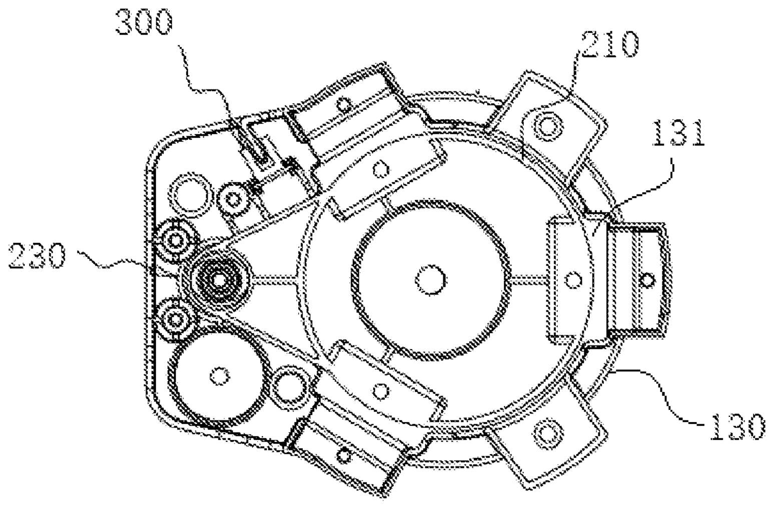
FIG. 3 is a top view of a bracket, a height adjustment mechanism and a cutting frame of the mower according to at least one embodiment.
Figure 4:
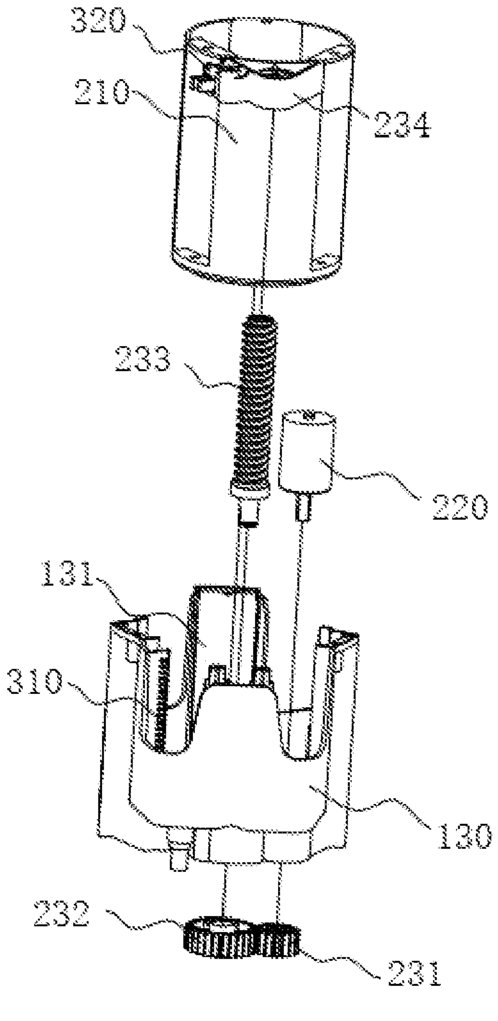
FIG. 4 is an exploded view of FIG. 3.
Figure 5:
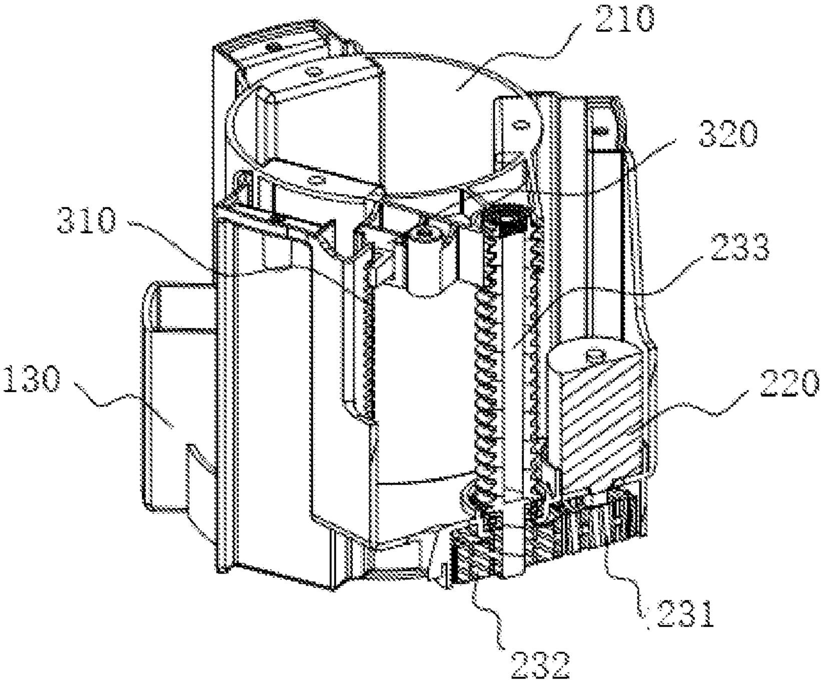
FIG. 5 is a partial perspective schematic structural view of FIG. 3.
Figure 6:
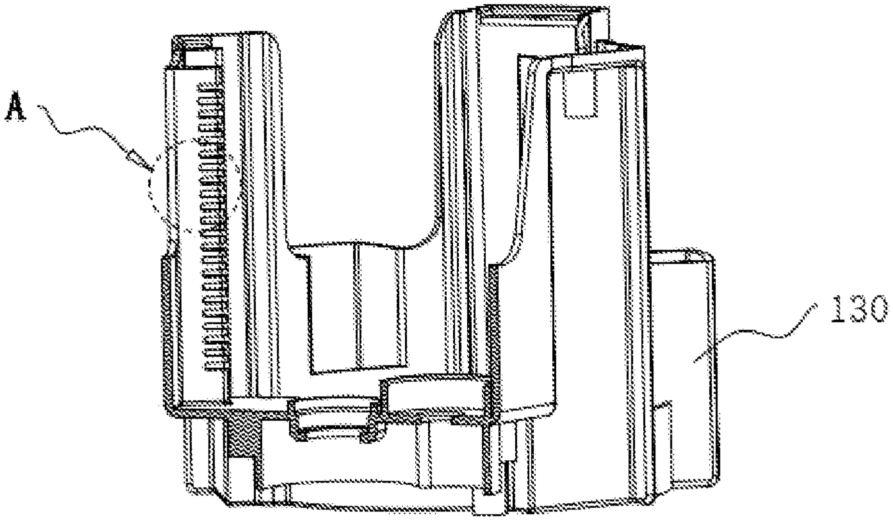
FIG. 6 is a schematic structural view of the bracket in FIG. 3.
Figure 7:
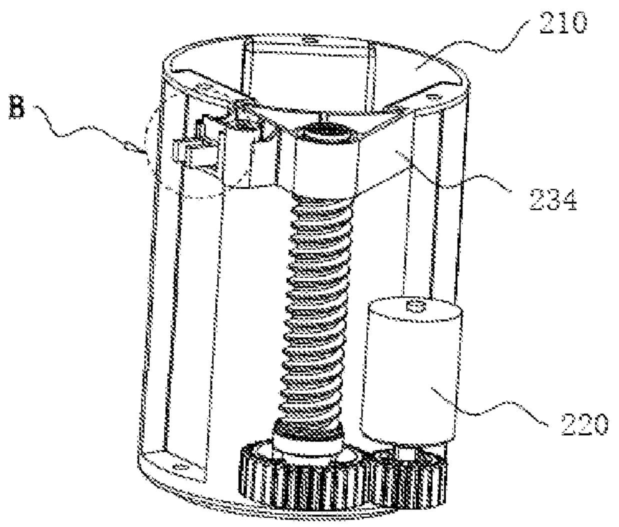
FIG. 7 is a schematic structural view of the cutting frame, a transmission structure and a first sensor in FIG. 3.
Figure 8:
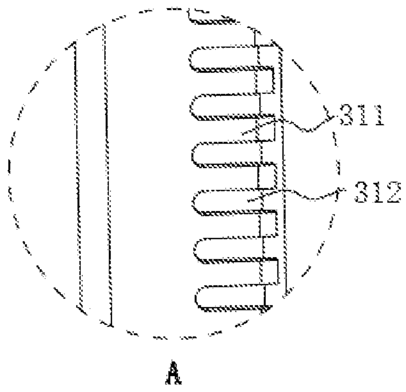
FIG. 8 is an enlarged view of area A in FIG. 6.
Figure 9:
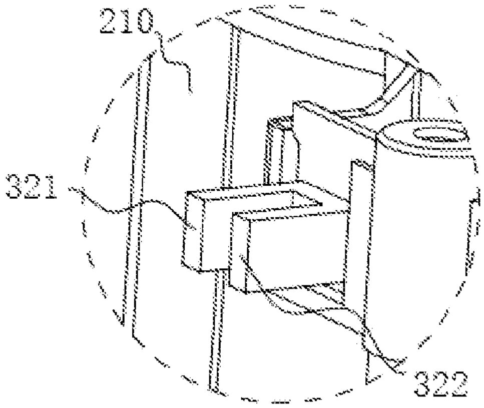
FIG. 9 is an enlarged view of area B in FIG. 7.
Figure 10:
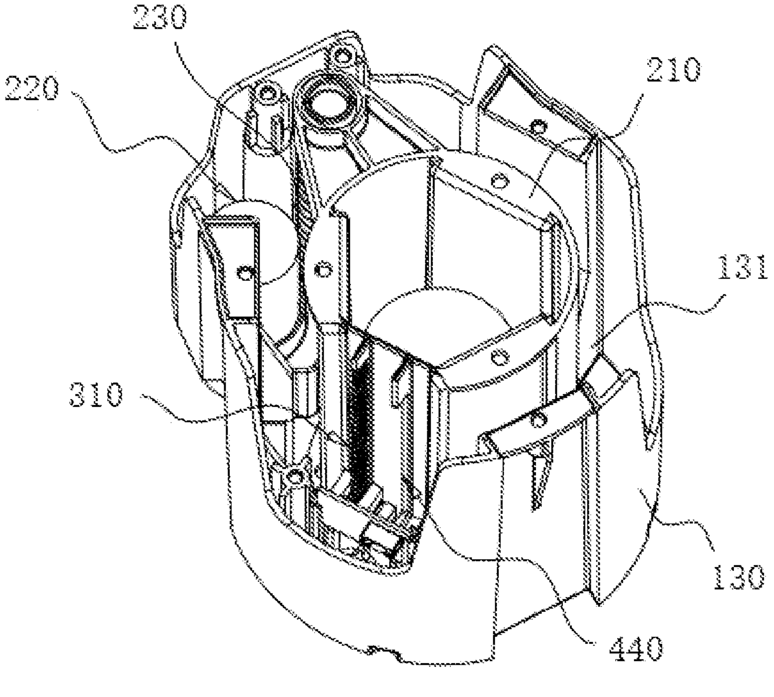
FIG. 10 is a schematic structural view of the bracket, the height adjustment mechanism and the cutting frame of the mower according to a second embodiment.
Figure 11:
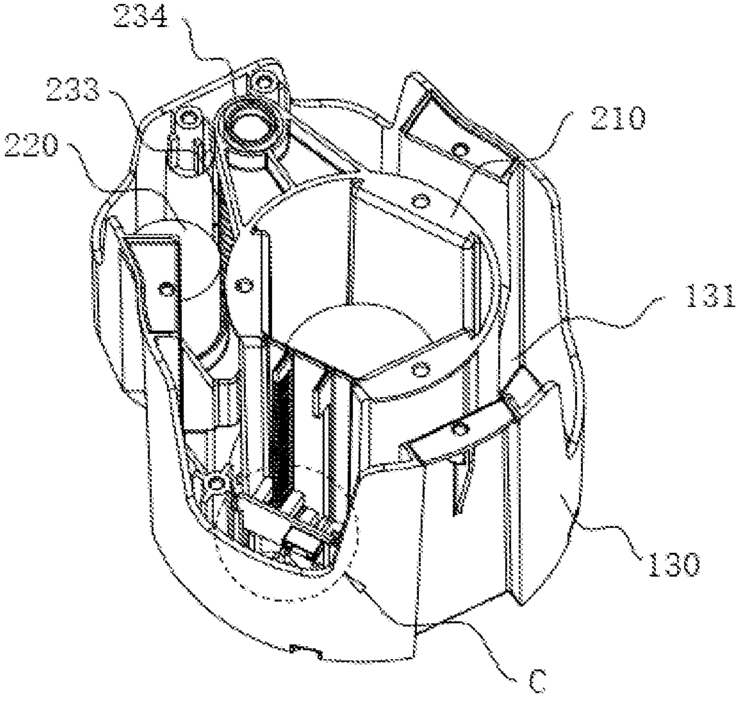
FIG. 11 is a schematic structural view of the bracket, the height adjustment mechanism and the cutting frame that is the same as FIG. 10.
Figure 12:
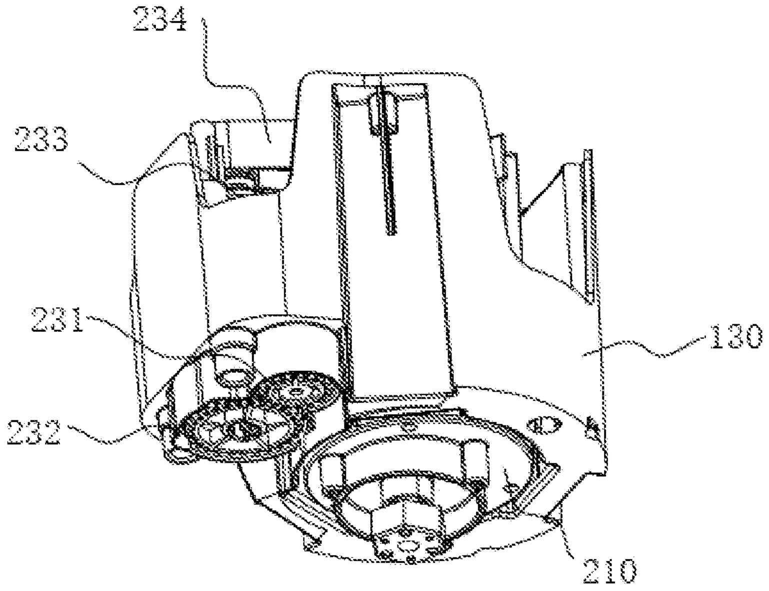
FIG. 12 is a schematic view of FIG. 10 from another angle.
Figure 13:
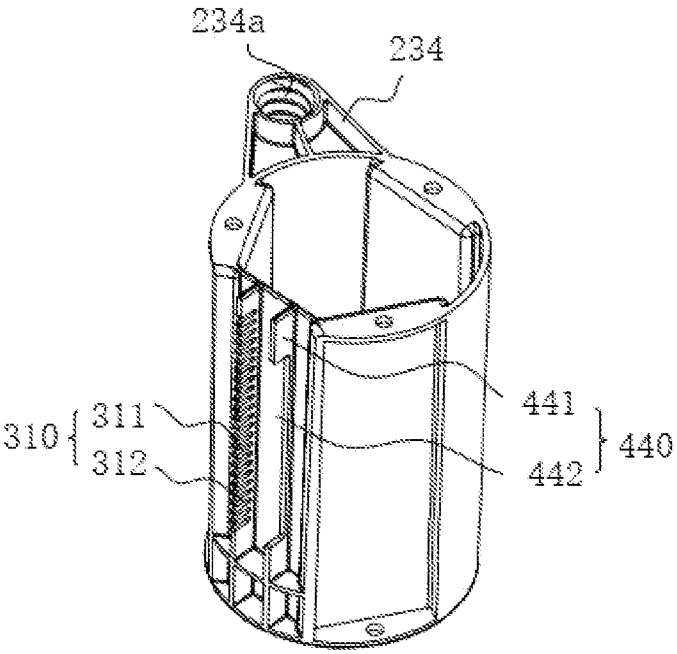
FIG. 13 is a schematic structural view of the cutting frame in FIG. 10.
Figure 14:
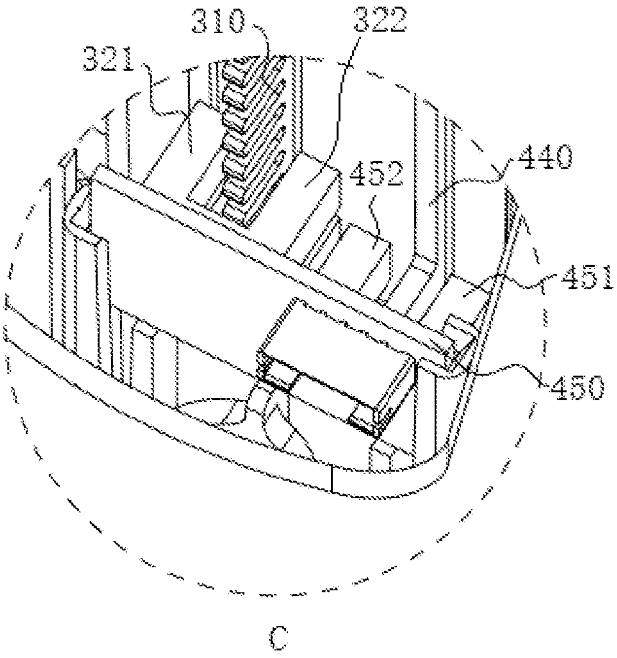
FIG. 14 is an enlarged view of area C in FIG. 11.
Figure 15:
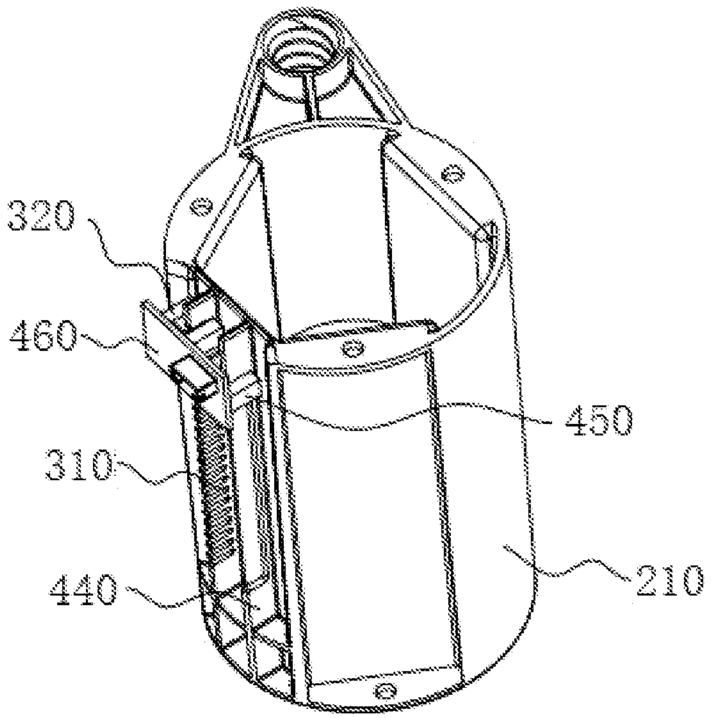
FIG. 15 is an assembling view of a sensing assembly, a height adjustment limiting structure and the cutting frame in FIG. 10.
Figure 16:
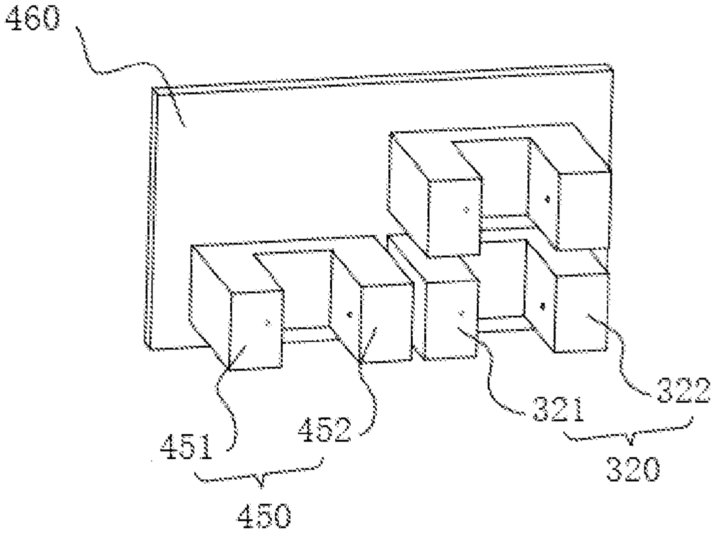
FIG. 16 is a schematic view of mounting positions of the first sensor and a second sensor in FIG. 10.
Figure 17:
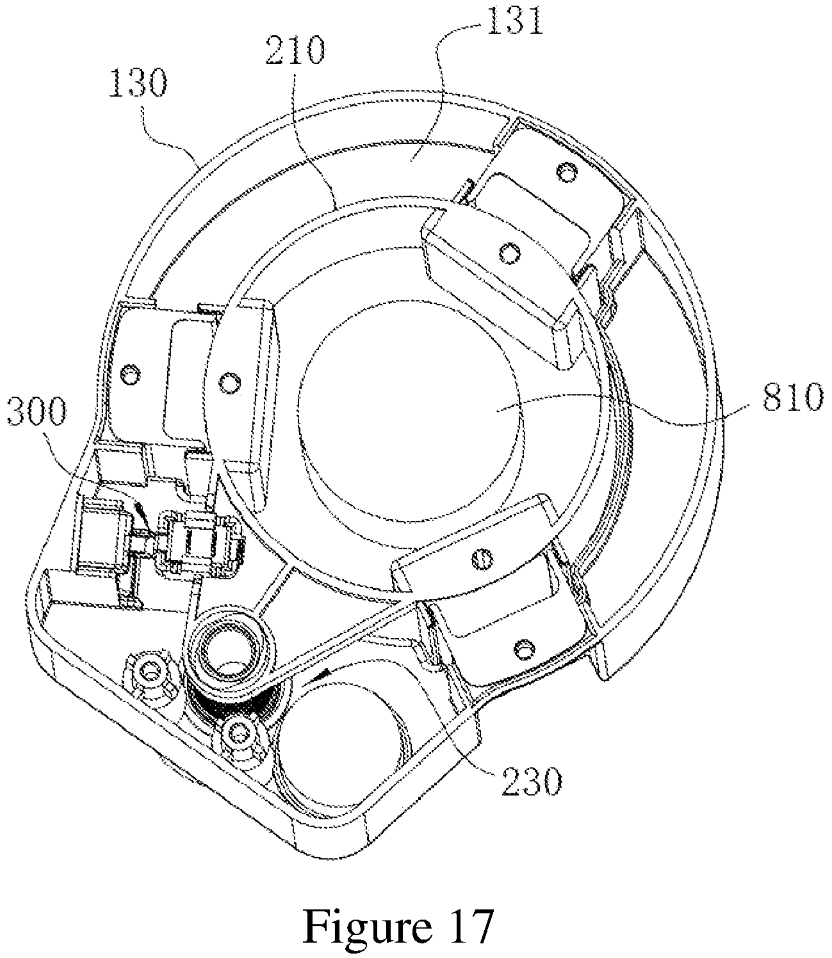
FIG. 17 is a schematic structural view of the bracket, the height adjustment mechanism and the cutting frame of the mower according to a third embodiment.
Figure 18:
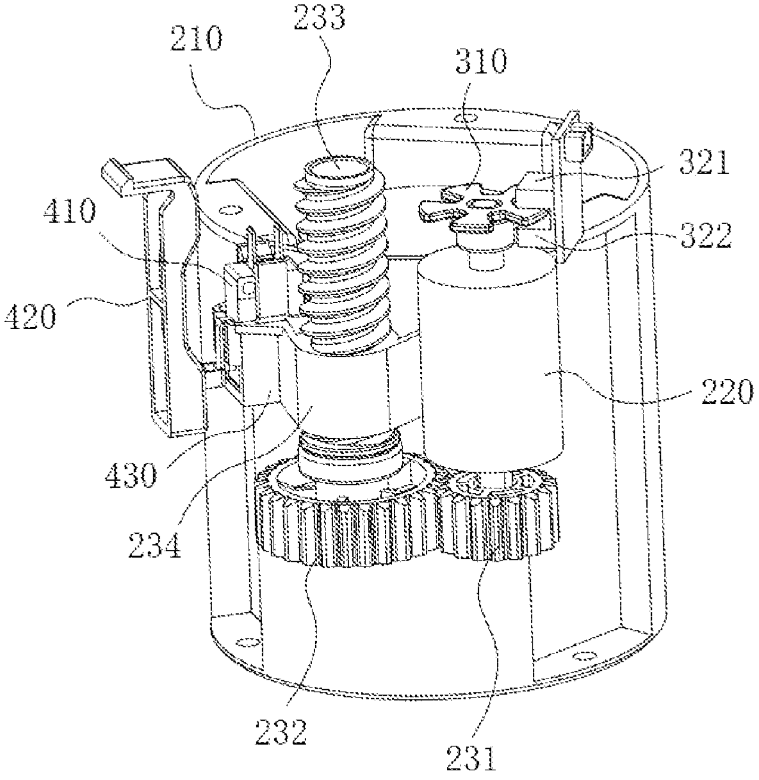
FIG. 18 is a schematic structural view of the cutting frame in FIG. 17 located at a lowest distance from the ground according to at least one embodiment.
Figure 19:
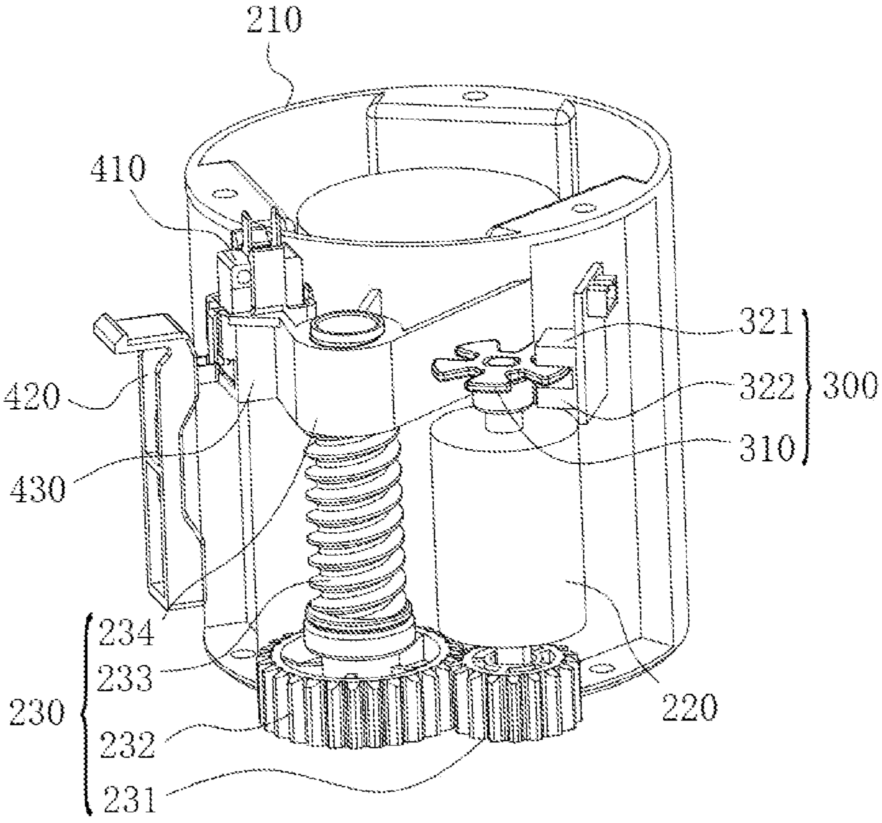
FIG. 19 is a schematic structural view of the cutting frame in FIG. 17 located at a highest distance from the ground according to at least one embodiment.

Please refer to FIG. 1 and FIG. 2. The mower provided of the disclosure is used for mowing of lawn, vegetation, etc., and in order to using in different geographical environments, a cutting height of the mower of the disclosure may be adjusted. The disclosure can not only be applied to electric mowers, but also can be applied to lawn mower, walk-behind mower or riding mower and so on. In addition, each performing mechanism in the mower in the disclosure may be directly driven by electric energy, using a storage battery or a direct plug-in mode, and may also adopt other modes such as gasoline engine driving, solar energy device driving.

Please refer to FIG. 1 through FIG. 39. The disclosure provides a mower. The mower includes a casing 100, a cutting device, a height adjustment mechanism 200, a sensing assembly 300 and a control unit (not labeled). The cutting device is provided with a cutting disc, and the cutting device is arranged on the casing 100. The height adjustment mechanism 200 can drive the cutting device to move along a height adjustment direction relative to the casing 100. The sensing assembly 300 is used for detecting a height adjustment distance of the cutting device relative to the casing 100 moving along the height adjustment direction, and the sensing assembly 300 is provided with a corresponding optical grating structure 310 and a first sensor 320. The optical grating structure 310 includes a hollow part 311 and a blocking part 312 distributed alternately. The first sensor 320 includes a first signal receiver 321 and a first signal transmitter 322, and a first signal between the first signal transmitter 322 and the first signal receiver 321 is periodically blocked during a height adjustment. The control unit controls the height adjustment of the height adjustment mechanism according to a number of times the first signal is blocked. Wherein, one of the optical grating structure 310 and the first sensor 320 is directly or indirectly arranged on the cutting device, and the other one of the optical grating structure 310 and the first sensor 320 is directly or indirectly on the casing 100. For example, please refer to embodiments of FIG. 10 through FIG. 16. The optical grating structure 310 is arranged on the cutting device, and the first sensor 320 is arranged on the casing 100. For example, please refer to embodiments of FIG. 3 through FIG. 9 and the embodiments of FIG. 17 through FIG. 24, the optical grating structure 310 is arranged on the casing 100, and the first sensor 320 is arranged on the cutting device.

For ease of understanding, it should be noted that in each embodiment corresponding to FIG. 1 through FIG. 16, the cutting device is not shown. In each embodiment corresponding to FIG. 17 through FIG. 32, only a cutting motor 810 in the cutting device is shown, but parts such as cutting disc are not shown. In each embodiment corresponding to FIG. 33 through FIG. 39, the cutting disc 820 used as the cutting device is shown.

It should be noted that, the first sensor 320 herein may adopt a photoelectric gate sensor, and the first signal transmitter 322 and the first signal receiver 321 all belong to parts of the photoelectric gate sensor.

When a height is adjusted, a preset height adjustment distance is input, the height adjustment mechanism begins to drive the cutting device to move along the height adjustment direction relative to the casing 100, and simultaneously, the sensing assembly 300 detects the height adjustment distance of the cutting device moving along the height adjustment direction relative to the casing 100. When an actual height adjustment distance reaches a preset height distance, and the height adjustment mechanism automatically stops running. Wherein, a principle that the sensing assembly 300 monitors the actual height adjustment distance is as follows: in an operation process of the height adjustment mechanism, the first signal transmitter 322 continuously transmits a first signal, and the first signal receiver 321 continuously receives the first signal. The transmitted first signal is blocked by the blocking part 312 and passes through the hollow part 311 alternately, so that when the first signal receiver 321 receives the first signal, every blocking part 312 blocks once, the first signal is interrupted once, and every time after passing through the hollow part 311 once, the first signal passes through once. Since one of the optical grating structure 310 and the first sensor 320 is arranged on the cutting frame 210, the other one of them is arranged on the casing 100, every time the first signal is blocked once and passes through once, and the cutting device moves relative to the casing 100 in the height adjustment direction by a height corresponding to a single period. Therefore, the actual height adjustment distance generated by the cutting device relative to the casing 100 along the height adjustment direction may be calculated through a number of times the first signal is blocked and passed between the first signal transmitter 322 and the first signal receiver 321. This mower not only automatically adjusts the height, but also enables a precise control of the height adjustment distance.

In some embodiments, please refer to FIG. 3 through FIG. 32. The height adjustment mechanism includes a cutting frame 210, a height adjustment motor 220 and a transmission structure 230. The cutting device is arranged on the cutting frame 210, the cutting device is further provided with a cutting motor 810 for driving the cutting disc to cut, and the cutting frame 210 is arranged in a sliding passage 131 of the casing 100. The height adjustment motor 220 is fixedly connected with the casing 100. The transmission structure 230 is connected with the height adjustment motor 220 and the cutting frame 210, the transmission structure 230 is used for converting a rotation motion output by the height adjustment motor 220 into a linear motion of the cutting frame 210 along the sliding passage 131, and the height adjustment motor 220 can drive the cutting frame 210 to slide along the sliding passage 131 to adjust the height. Wherein, one of the optical grating structure 310 and the first sensor 320 is arranged on the cutting frame 210, which means that one of the optical grating structure 310 and the first sensor 320 is indirectly arranged on the cutting device through the cutting frame 210.

When the height is adjusted, power provided by the height adjustment motor 220 is transmitted to the cutting frame 210 through the transmission structure 230, so as to drive the cutting frame 210 to slide along the sliding passage 131.

It should be noted that, "the cutting frame 210 is mounted in the sliding passage 131 of the casing 100" here means that at least part of the cutting frame 210 is located in the sliding passage 131, and as the cutting frame 210 moves along the height adjustment direction, there are parts of the cutting frame 210 that may extend out of the sliding passage 131.

Please refer to FIG. 1 through FIG. 3, FIG. 10 and FIG. 17. In some embodiments of the disclosure, the casing 100 includes a base 110 and a cover 120 matched with the base 110. A supporting base 130 is further arranged on the base 110, the sliding passage 131 penetrates through and is arranged on the supporting base 130, the cutting frame 210 may slide in the sliding passage 131 and at least partially extends out of the sliding passage 131 in a direction away from the cover 120, so that the cutting device on the cutting frame 210 can cut lawn, vegetation, etc.

Figure 39:
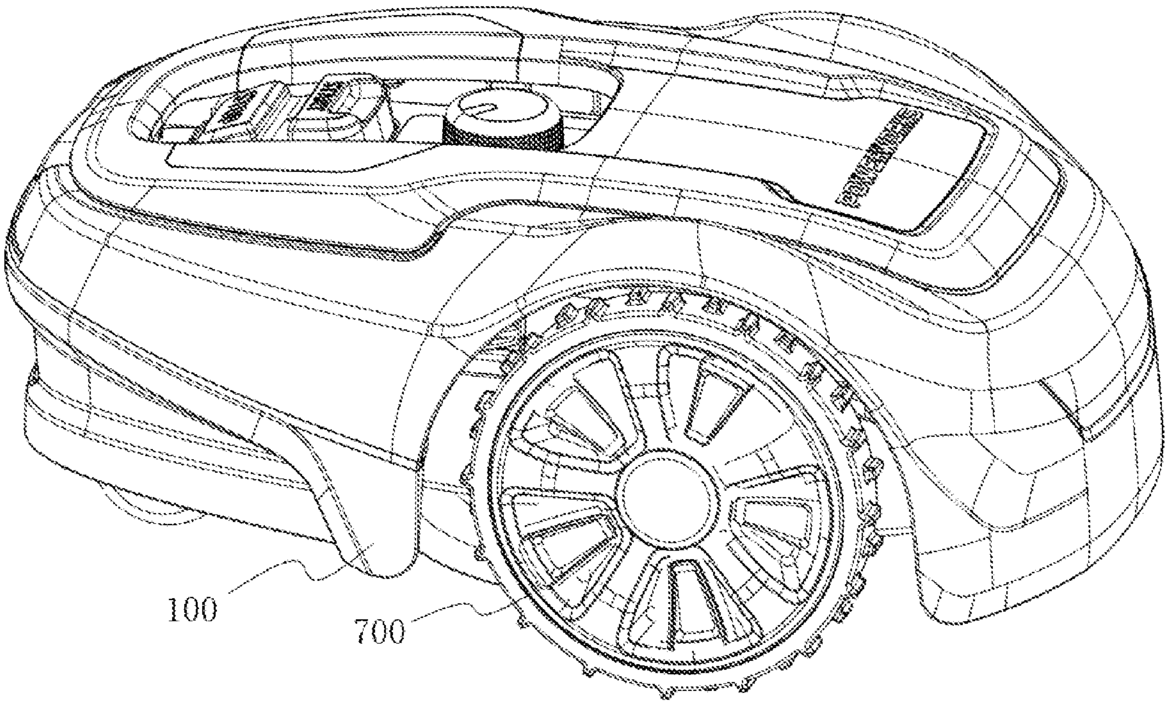
FIG. 39 is an overall schematic structural view of the mower corresponding to FIG. 33.

Please refer to FIG. 1, FIG. 2 and FIG. 39. In some embodiments of the disclosure, the casing 100 is further provided with a walking mechanism to realize an overall movement of the mower in a working process. For ease of understanding, for example, please refer to FIG. 1 and FIG. 2, the walking mechanism includes two driving wheels and two driven wheels, and the two driving wheels may be connected with each other by a rotating shaft. For example, please refer to FIG. 39. The walking mechanism includes two driving wheels and one driven wheel. In an actual embodiment process, this driving wheel may be connected with a motor or an engine by the rotating shaft, and the driven wheel may adopt a universal wheel to realize an adjustment of a walking direction. A structure of the driving wheel and the driven wheel all belong to a conventional structure, which is not repeated here.

For ease of understanding, following will describe possible embodiments of the optical grating structure 310:

in some embodiments, please refer to FIG. 10 through FIG. 16, the optical grating structure 310 is strip-shaped, and each hollow part 311 and each blocking part 312 of the optical grating structure 310 are alternately arranged along the height adjustment direction, wherein, the optical grating structure 310 is arranged on the cutting frame 210, and the first sensor 320 is arranged on the casing 100. The first signal receiver 321 and the first signal transmitter 322 of the first sensor 320 are correspondingly distributed on two sides of the optical grating structure 310.

In some embodiments, the plurality of hollow parts 311 and blocking parts 312 in the optical grating structure have a same size. In this structure, sizes of the hollow part 311 and the blocking part 312 are equal along the height adjustment direction, and the sizes of the hollow part 311 or the blocking part 312 along the height adjustment direction are equivalent to half of period height ½h.

When the height is adjusted, the cutting frame 210 moves along the height adjustment direction. Since the optical grating structure 310 is arranged on the cutting frame 210, the optical grating structure 310 also moves along the height adjustment direction with the cutting frame 210, then each hollow part 311 and each blocking part 312 arranged alternately along the height adjustment direction in the optical grating structure 310 will pass through the first sensor 320 in sequence, so that the first signal receiver 321 in the first sensor 320 receives the first signal alternately, then the first signal is alternately blocked, then a sum n of the times that the first signal is blocked and received may be multiplied by the half of period height ½h to get an actual height adjustment distance H, which is $H=n*(½h)$.

In another specific embodiment, please refer to FIG. 3 through FIG. 9, the optical grating structure 310 is strip-shaped, and each hollow part 311 and each blocking part 312 of the optical grating structure 310 are alternately arranged along the height adjustment direction, wherein, the optical grating structure 310 is arranged on the casing 100, and the first sensor 320 is arranged on the cutting frame 210. At this moment, the first signal receiver 321 and the first signal transmitter 322 of the first sensor 320 are still correspondingly distributed on two sides of the optical grating structure. This structure can also realize a measurement of the actual height adjustment distance.

In some embodiments, with the strip-shaped optical grating structure mentioned above, there are two first sensors 320, and the two first sensors 320 are arranged along a length direction of the optical grating structure 310. It should be understood that, regardless of whether the first sensor 320 is arranged on the cutting frame 210 or on the casing 100, when there are two or more than two first sensors 320, and each first sensor 320 is distributed along the height adjustment direction, a mode of adopting two or more than two first sensors 320 is conducive to noise reduction to data compared with a mode of adopting a single first sensor 320. That is to say, when the height adjustment is completed, if one of the first sensors is located near an intersection of the hollow part 311 and the blocking part 312, due to reasons such as vibration, wrong data may be collected. And if at least two first sensors are arranged, relatively more accurate data collected by the other first sensor may also be obtained, which is conducive to a more accurate control of the height adjustment distance.

In another embodiment, please refer to FIG. 17 through FIG. 24. The optical grating structure 310 is disc-shaped, and connected with the height adjustment motor 220 and rotates with the height adjustment motor, and each hollow part 311 and each blocking part 312 of the optical grating structure 310 are alternately, evenly and circumferentially distributed on the optical grating structure. At this time, the height adjustment motor 220 is further connected with the transmission structure 230.

When adopting this structure, if y hollow parts 311 and y blocking parts 312 are arranged along the circumferential direction in the optical grating structure, a number of triggering signals is n. For the whole transmission structure 230, the height adjustment distance corresponding to each rotation of an output end of the height adjustment motor 220 is ho, then a relationship formula that obtains the actual height adjustment distance according to a number of times that a receiving signal is interrupted is as follows:

$$H = n\,h_0/y$$

Figure 20:
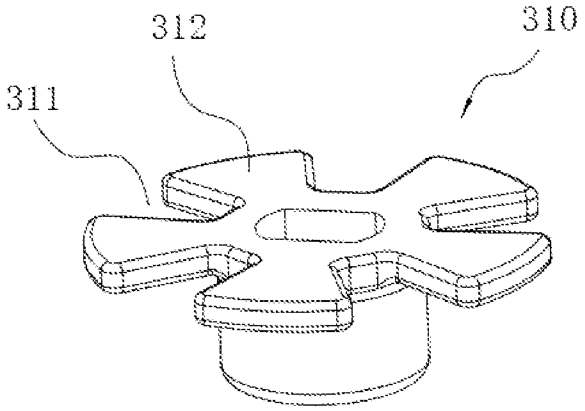
FIG. 20 is a schematic structural view of an optical grating structure in FIG. 18.

In FIG. 20, y=5, in an actual implementation process, the number of the hollow part 311 may also be only one, so that every turn of the motor rotates, the signal is blocked by the blocking part 312 once, and the signal passes through the hollow part 311 once, which means that y=1.

In some embodiments, please refer to FIG. 10 through FIG. 24. The height adjustment mechanism is further correspondingly provided with a height adjustment limiting structure 400 configured to limit a minimum cutting height and a highest cutting height of the cutting device.

In an embodiment, please refer to FIG. 10 through FIG. 16. The height adjustment limiting structure 400 includes a light blocking piece 440 and a second sensor 450, the light blocking piece 440 includes an intercepting portion 441 located at the highest cutting height, an intercepting portion 411 located at the lowest cutting height and a hollow portion 442 located between the two intercepting portions 441, and the intercepting portion 441 is configured to block a signal of the second sensor 450. In a corresponding embodiment in FIG. 10 through FIG. 16, the light blocking piece 440 is arranged on the cutting frame 210, and the second sensor 450 is arranged on the casing 100. In an actual implementation, the light blocking piece 440 may also be arranged on the casing 100, and the second sensor 450 is arranged on the cutting frame 210.

In the corresponding embodiment in FIG. 10 through FIG. 16, the supporting base 130 of the casing 100 is provided with a mounting plate 460. The second sensor 450 is arranged on the mounting plate 460, and the first sensor 320 is also arranged on the mounting plate 460. The optical grating structure 310 and the light blocking piece 440 are arranged on the cutting frame 210, and the optical grating structure 310 adopts the strip-shaped optical grating structure in the embodiment mentioned above. Wherein, the second sensor 450 is on a same horizontal plane as the first sensor 320 located at the mounting plate 460 close to a bottom wall of the supporting base 130. It should be noted that, the second sensor 450 may be the photoelectric gate sensor, and the second sensor 450 includes a second signal transmitter 451, a second signal receiver 452 and other components. The second signal transmitter 451 is symmetrically arranged with the second signal receiver 452, and there is a certain gap between the second signal transmitter 451 and the second signal receiver 452 for placing the light blocking piece 440. The light blocking piece 440 is fixed on the cutting frame 210, a length direction of the light blocking piece 440 is arranged along a sliding direction of the cutting frame 210, and a hollow portion 442 for signal passage and an intercepting portion 441 for blocking the signal are formed on the light blocking piece 440. Further, the intercepting portion 441 is located at two ends of the length direction of the light blocking piece 440, and a length size of the hollow portion 442 on the light blocking piece 440 is the same as a sum of the lengths of all hollow parts 311 and all blocking parts 312 in the optical grating structure 310.

It should be noted that, every time a signal between the second signal transmitter 451 and the second signal receiver 452 is interrupted, it is indicated that a mowing height has reached an allowable maximum mowing height or an allowable minimum mowing height, thereby protecting a whole set of height adjustment system from causing damage to the mower because of untimely control.

Figure 21:
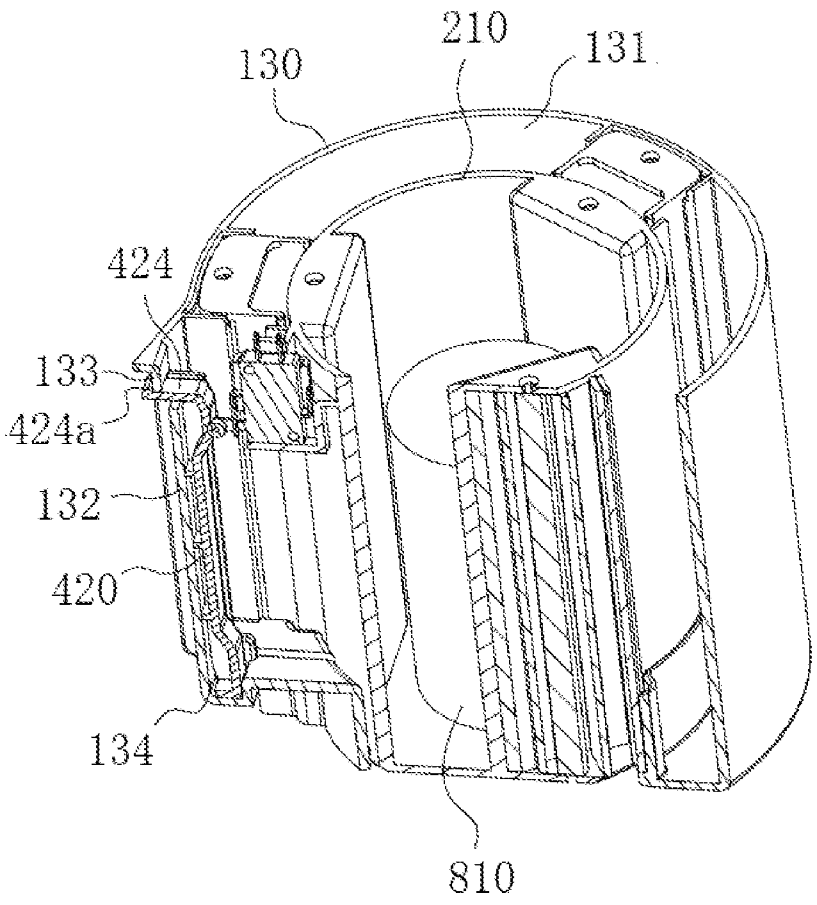
FIG. 21 is an overall cross-sectional view corresponding to FIG. 17.

Please refer to FIG. 17 through FIG. 24. In another specific embodiment, the height adjustment limiting structure 400 includes a micro switch 410 and a triggering component 420 for triggering the micro switch 410. Wherein, the micro switch 410 is arranged on the cutting frame 210, and the triggering component 420 is arranged on the casing 100. When the cutting frame 210 is adjusted to the highest distance from the ground or the lowest distance from the ground, the triggering component 420 triggers the micro switch 410, and the height adjustment motor 220 stops. In FIG. 21, the triggering component 420 is arranged on the supporting base 130, which enables the triggering component 420 to be indirectly arranged on the casing.

This structure can limit an extreme position of a distance from the ground of the cutting frame 210, and has a protective effect on the whole height adjustment device. The height adjustment limiting structure 400 is simpler in structure and lower in cost than a separating limitation method. In an actual embodiment, the micro switch 410 may also be arranged on the casing 100, and the trigger 420 may be arranged on the cutting frame 210.

Figure 22:
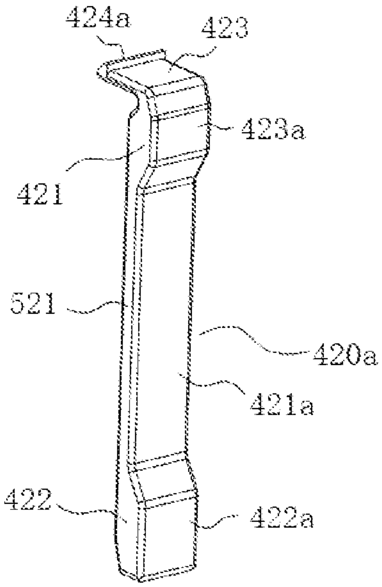
FIG. 22 is a schematic structural view of a triggering component in FIG. 18.

Please refer to FIG. 21 and FIG. 22. The triggering component 420 includes a triggering component body 421, a high-level triggering part 423 protruding on the triggering component body 421 and a low-level triggering part 422 protruding on the triggering component body 421. The high-level triggering part 423 and the low-level triggering part 422 are arranged at intervals along a height direction, and an avoidance space 420*a* is formed between the high-level triggering part 423 and the low-level triggering part 422.

When the micro switch 410 moves with a movement of the cutting frame 210 to a position corresponding to the avoidance space 420*a*, the micro switch 410 is spaced from the triggering component 420 and they are not in contact with each other. The micro switch 410 is in a non-triggering state, and the height adjustment motor 220 is all to drive the cutting frame 210 to carry out the height adjustment.

When the cutting frame 210 is located at position with the highest distance from the ground, the high-level triggering part 423 contacts and triggers the micro switch 410, and the height adjustment motor 220 stops running. When the cutting frame 210 is located at position with the lowest distance from the ground, the low-level triggering part 422 contacts and triggers the micro switch 410, and the height adjustment motor 220 stops running.

Please refer to FIG. 22. The high-level triggering part 423 is provided with a high-level triggering surface facing the micro switch 410, and the low-level triggering part 422 is provided with a low-level triggering surface facing the micro switch 410. A spacing surface facing the avoidance space 420*a* is arranged on the triggering component body 421, and the spacing surface is separated from the micro switch 410 by the avoidance space 420*a*. A transition between the high-level triggering surface and the spacing surface is through a first transition slope, and a transition between the low-level triggering surface and the spacing surface is through a second transition slope. This structure enables that when a height position of the cutting frame 210 reaches the highest or lowest distance from the ground, the micro switch 410 can smoothly contact the high-level triggering surface or the low-level triggering surface, so that it is reliably triggered, and a reliability of the device is improved.

Please refer to FIG. 21 and FIG. 22. A first limiting groove 134 is formed in the supporting base 130, a bottom of the triggering component 420 is inserted into the first limiting groove 134, an upper end of the triggering component 420 is provided with an elastic clamping arm 424, and the supporting base 130 is provided with a clamping groove for the elastic clamping arm 424 to be clamped into. This structure can realize a quick disassembly and assembly of the triggering component 420. When disassembling the triggering component 420, it is only necessary to withdraw the elastic clamping arm 424 from the clamping groove, the triggering component 420 may be taken out from the first limiting groove 134, and the whole triggering component 420 is removed from the supporting base 130. When the triggering component 420 is mounted, only the bottom of the triggering component 420 needs to be inserted into the first limiting groove 134, and after the elastic clamping arm 424 is clamped into the clamping groove, and a mounting may be completed.

Please refer to FIG. 21 and FIG. 22. The supporting base 130 is provided with a limiting vertical plate 132, the limiting vertical plate 132 blocks one side of the triggering component 420 facing away from the micro switch 410. A clamping plate 133 is arranged above the limiting vertical plate 132, and the clamping groove is formed between a bottom of the clamping plate 133 and a top of the limiting vertical plate 132. An end of the elastic clamping arm 424 is provided with a first limiting part 424*a*, the elastic clamping arm 424 passes through the clamping groove, and the clamping plate 133 clamps the first limiting part 424*a*.

Please refer to FIG. 21. In some embodiment of the disclosure, the clamping plate 133 is parallel to the limiting vertical plate 132 and is located at an outer side of the limiting vertical plate 132, and correspondingly, the cutting frame 210 is located at an inner side of the limiting vertical plate 132. This structure enables a size of the clamping groove to be large enough to provide enough space for the elastic clamping arm 424 to deform and be clamped in.

Please refer to FIG. 18, FIG. 19, FIG. 23 and FIG. 24. In some embodiments of the disclosure, the height-position limiting assembly further includes a mounting base 430 connected with the cutting frame 210, and the micro switch 410 is detachably mounted on the mounting base 430.

Figure 24:
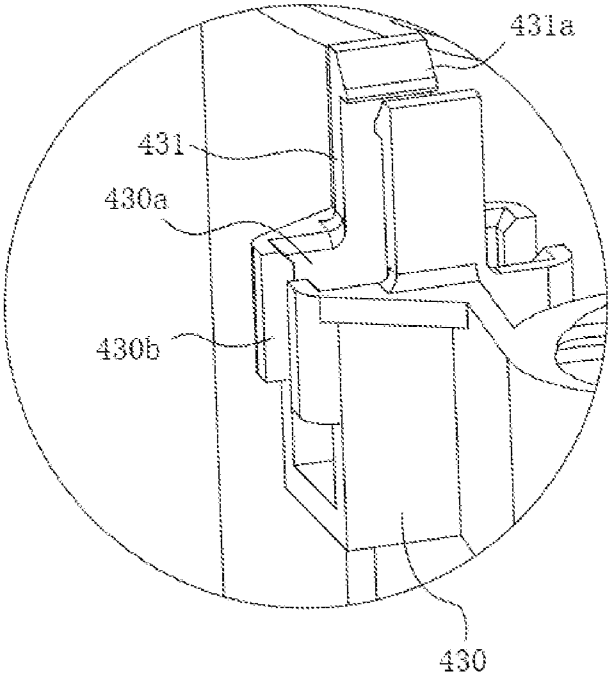
FIG. 24 is an enlarged view of area I in FIG. 23.
Figure 25:
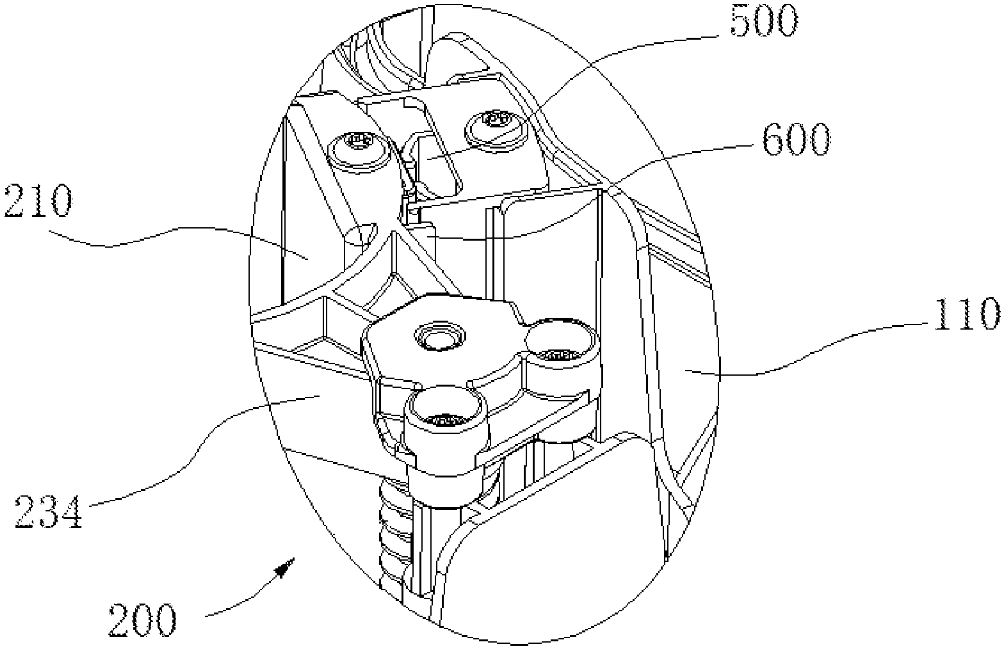
FIG. 25 is an enlarged view of area D in FIG. 2.

In some embodiments, please refer to FIG. 24. The mounting base 430 is provided with a plug-in cavity 430*a* and an elastic snapping arm 431, the micro switch 410 is arranged in the plug-in cavity 430*a*, and the elastic snapping arm 431 is provided with a second limiting part 431*a* for limiting the micro switch 410 in the plug-in cavity 430*a*. This structure can realize a quick disassembly and assembly of the micro switch 410.

Figure 23:
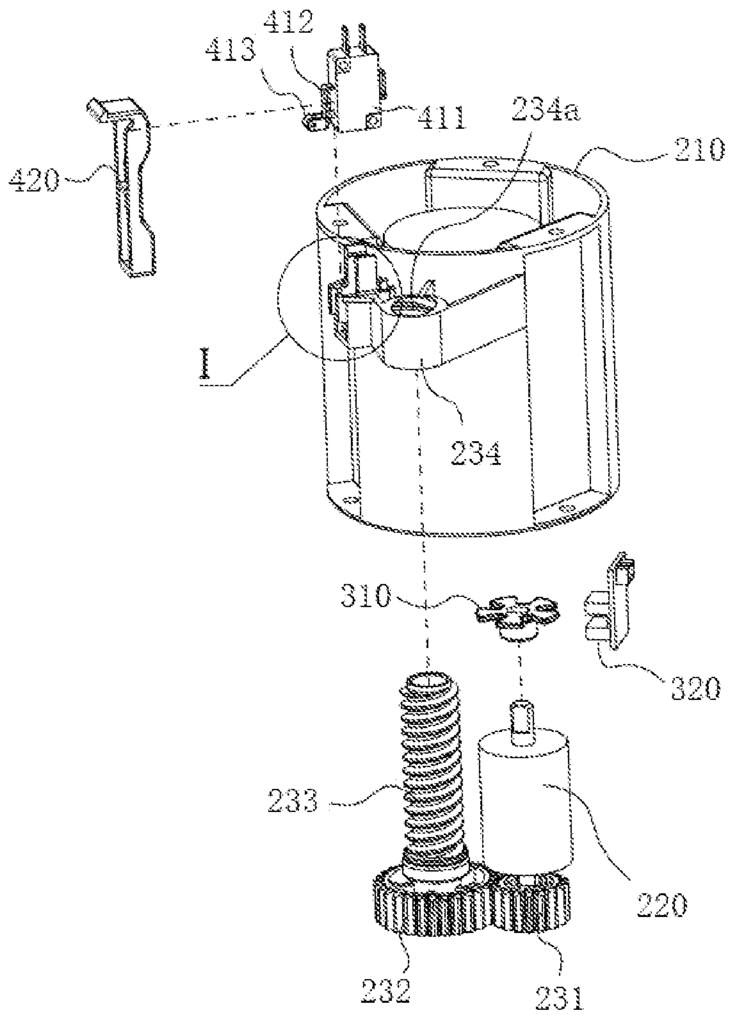
FIG. 23 is an exploded view of FIG. 17 after removing a supporting base.

Please refer to FIG. 23 and FIG. 24. In some embodiments of the disclosure, the two elastic snapping arms 431 are symmetrically arranged on the mounting base 430, and the second limiting part 431*a* is provided with a guiding slope that is convenient for the micro switch 410 to squeeze into between the two elastic snapping arms 431.

Please refer to FIG. 23 and FIG. 24. In some embodiments of the disclosure, the micro switch 410 includes a micro switch body 411 and an elastic piece 412 arranged on the micro switch body 411. An opening 430*b* communicated with the plug-in cavity 430*a* is formed and arranged on the mounting base 430. A first end of the elastic piece 412 is connected with the micro switch body 411, a second end of the elastic piece 412 stretches out the opening 430*b*, and is connected with a triggering roller 413, and when the triggering component 420 extrudes the triggering roller 413, the micro switch 410 is triggered through the elastic piece 412.

It should be understood that any kind of sensing assembly and any kind of height adjustment limiting structure may be applied to the mower in which the cutting device is lifted relative to the casing. For example, although the embodiments corresponding to FIG. 25 through FIG. 32 and the embodiments corresponding to FIG. 33 through FIG. 39 do not show any sensing assemblies and height adjustment limiting structures, the sensing assemblies and height adjustment limiting structures can also be applied to these embodiments with only slight modifications to realize the accurate adjustment of the mowing height.

For ease of understanding, following will describe possible embodiments of the transmission structure 230.

In some embodiments, please refer to FIG. 3 through FIG. 32. The transmission structure 230 includes a transmission rod 233 and a transmission part 234. The transmission rod 233 can be driven and rotated by the height adjustment motor 220. The transmission part 234 is arranged on the cutting frame 210, and the transmission part 234 is provided with a screw hole 234*a*. Wherein the transmission rod 233 penetrates and is arranged in the screw hole 234*a* and is threaded with the screw hole 234*a*. The transmission structure 230 can enable each output rotation power of the height adjustment motor 220 to correspond to a smaller height adjustment distance of the cutting frame 210, and can also realize a more accurate control of the height adjustment distance.

In some embodiments, the transmission structure 230 further includes a driving gear 231 and a driven gear 232. The driving gear 231 is connected with the height adjustment motor 220, the driven gear 232 is coaxially fixed with the transmission rod 233, and the driven gear 232 is meshed with the driving gear 231. It should be noted that, when a number of teeth of the driven gear 232 is greater than a number of teeth of the driving gear 231, an accuracy of the control of the height adjustment distance can also be further improved.

In an embodiment, please refer to FIG. 25 through FIG. 32. The mower further includes a shock absorbing mechanism 500 and a guiding mechanism 600. The guiding mechanism 600 is connected with the shock absorbing mechanism 500, and the guiding mechanism 600 and the shock absorbing mechanism 500 can slide relative along the height adjustment direction of the cutting frame 210, so as to realize a height adjustment guidance. One of the shock absorbing mechanism 500 and the guiding mechanism 600 is mounted on the cutting frame 210, and the other one is mounted on the casing 100. The shock absorbing mechanism 500 includes a shock absorbing base 510, a first elastic deformation part 520 arranged on the shock absorbing mechanism 510 and a second elastic deformation part 530 arranged on the shock absorbing mechanism 510. Wherein, the first elastic deformation part 520 is elastically abutted against the guiding mechanism 600 to limit a swing and tilt of the cutting frame 210 relative to the height adjustment direction, and the second elastic deformation part 530 is elastically abutted against the guiding mechanism 600 to limit a shaking of the cutting frame 210 in a radial direction.

Please refer to FIG. 25 through FIG. 32. In some embodiments of the disclosure, the cutting frame 210 is provided with a mounting groove 211, the guiding mechanism 600 is mounted in the mounting groove 211, and the shock absorbing mechanism 500 is arranged on the casing 100. Or the shock absorbing mechanism 500 is mounted in the mounting groove 211, and the guiding mechanism 600 is arranged on the casing 100. By arranging the mounting groove 211 on the cutting frame 210, not only the shock absorbing mechanism 500 and the guiding mechanism 600 can be disassembled, assembled and replaced according to demands, which is convenient for the maintenance, but also the shock absorbing mechanism 500 and the guiding mechanism 600 are independent parts and can be produced and processed separately and suitable production materials can be selected, which reduces a matching accuracy and a processing difficulty.

It should be noted that in each embodiment corresponding to FIG. 3 to FIG. 24, an unlabeled mounting groove is also arranged, and the guiding mechanism and the shock absorbing mechanism herein may also be applied to the mower of these embodiments.

In some embodiments, the shock absorbing mechanism 500 and the guiding mechanism 600 may be made of metal materials, for example, they may be made of aluminum profiles.

In some embodiments, please refer to FIG. 26 through FIG. 28, FIG. 30 through FIG. 32. The guiding mechanism 600 includes a guiding base 610, and two guiding plates 620 are relatively arranged on the guiding base 610. A guiding groove 640 along the height adjustment direction is formed between the two guiding plates 620, and the first elastic deformation part 520 of the shock absorbing mechanism 500 stretches into the guiding groove 640 and abuts against an inner wall of the guiding plate 620. This enables a relative sliding between the guiding mechanism 600 and the shock absorbing mechanism 500 to achieve the height adjustment guidance and prevent the cutting frame 210 from swinging and tilting in the height adjustment direction, thereby preventing the cutting frame 210 from tilting and vibrating during operation, and avoiding noise caused by vibration.

In some embodiments, please refer to FIG. 26 through FIG. 28, FIG. 30 through FIG. 31. In a specific embodiment of the disclosure, the first elastic deformation part 520 includes two first elastic plates 521 that are arranged oppositely. A first end of the first elastic plate 521 is connected with the shock absorbing base 510, and a second end of the first elastic plate 521 is a suspended end. The suspended end of the first elastic plate 521 stretches into the guiding groove 640 and abuts against the inner wall of the guiding plate 620 outward.

In some embodiments, please refer to FIG. 26 through FIG. 28, FIG. 30 through FIG. 31. In a specific embodiment of the disclosure, the suspended end of the first elastic plate 521 is provided with a first protrusion 5211 protruding in a direction where the guiding plate 620 is located, and the first protrusion 5211 is provided with an arc-shaped surface in contact with the inner wall of the guiding plate 620. A protruding direction of the first protrusion 5211 is towards the inner wall of the guiding plate 620, so that the first protrusion 5211 entering the guiding groove 640 may elastically abut against the inner wall of the corresponding guiding plate 620, which avoids the swinging and tilting caused by the gap. And through an arc surface contact, not only it is conducive to the first protrusion 5211 to slide relatively to the guiding plate 620, but also can avoid causing damage to the inner wall of the guiding plate 620 in a sliding process, which prolongs a duration life.

In some embodiments, please refer to FIG. 26 through FIG. 28, FIG. 30 through FIG. 31. In a specific embodiment of the disclosure, the first elastic plate 521 may be arranged perpendicular to the shock absorbing base 510.

In some embodiments, please refer to FIG. 26 through FIG. 28, FIG. 30 through FIG. 31. In a specific embodiment of the disclosure, the first elastic plate 521 may further be obliquely arranged on the shock absorbing base 510, and an angle formed between the first elastic plate 521 and the shock absorbing base 510 is greater than 90°, so that a distance between the two first elastic plates 521 is gradually increased from one end close to the shock absorbing base 510 to one end away from the shock absorbing base 510. In an embodiment, a cross-section of a passage formed between the two first elastic plates 521 is in a shape of a bell mouth.

In some embodiments, please refer to FIG. 25 through FIG. 28 and FIG. 30. In a specific embodiment of the disclosure, a connecting plate is arranged on at least one end of the shock absorbing base 510, and the connecting plate protrudes and is arranged on one side of the shock absorbing base 510 towards the guiding mechanism 600. The second elastic deformation part 530 protrudes out of an end part of the connecting plate, which prevents the second elastic deformation part 530 from being unable to elastically abut with the limiting part 630 due to an interference by the connecting plate. When the shock absorbing base 510 is mounted on the cutting frame 210 or is mounted on the base 110, it may be connected with the connecting plate through a tightening component, so that the shock absorbing base 510 is fixed on the cutting frame 210 or the base 110. In this embodiment, the shock absorbing base 510 is mounted on the base 110. Wherein, the connecting plate and the shock absorbing base 510 may be formed integrally.

Please refer to FIG. 26 through FIG. 28, FIG. 30 and FIG. 31. In an embodiment of the disclosure, one side of the guiding plate 620 close to the shock absorbing mechanism 500 is provided with a guiding surface 621 for guiding the first elastic deformation part 520 to stretch into the guiding groove 640.

Figure 26:
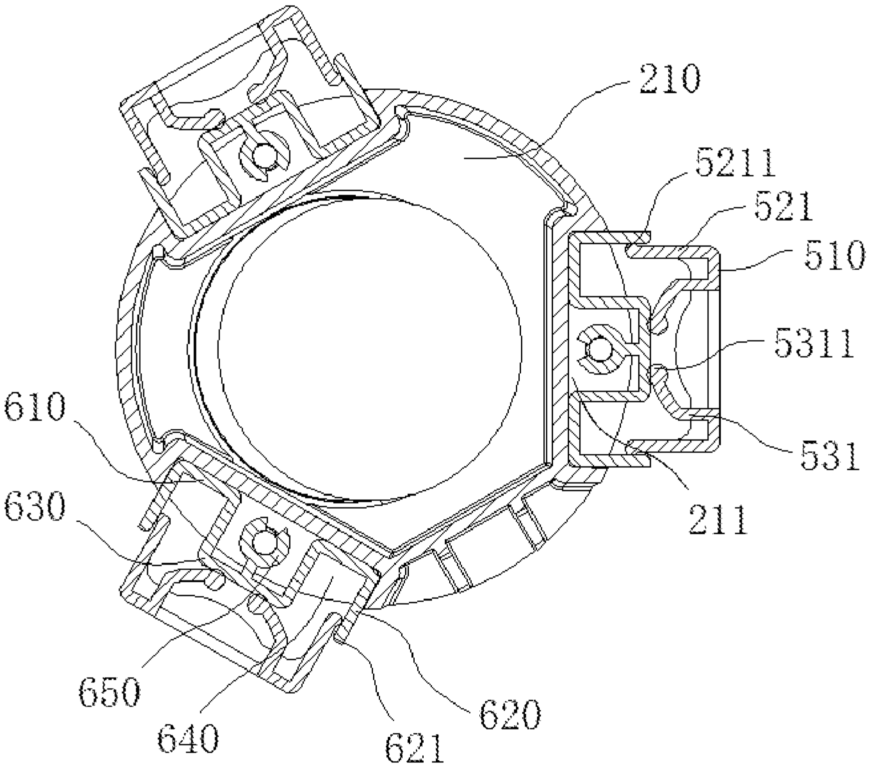
FIG. 26 is a cross-sectional view of the cutting frame, a shock absorbing mechanism, a guiding mechanism of the mower after assembled according to a second embodiment.
Figure 31:
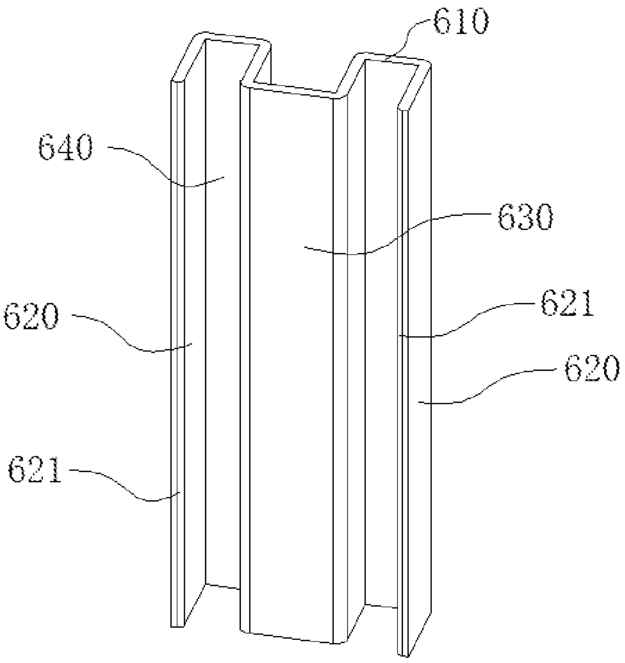
FIG. 31 is a schematic structural view of the guiding mechanism according to at least one embodiment.

In some embodiments, please refer to FIG. 26 and FIG. 31. In a specific embodiment of the disclosure, the guiding surface 621 may be an arc-shaped surface, which is conducive to guiding the first elastic deformation part 520 to slide into the guiding groove 640 along the guiding surface 621. In some embodiments, please refer to FIG. 4 and FIG. 9. In a specific embodiment of the disclosure, the guiding surface 621 may also be an inclined plane, and a cross-section of the passage formed by the guiding surfaces on the two guiding plates 620 is in a shape of a bell mouth. A width of the opening 430*b* close to the guiding base 610 is smaller than a width of the opening 430*b* away from the guiding base 610. Please refer to FIG. 4 through FIG. 6, FIG. 8 and FIG. 9. In a specific embodiment of the disclosure, the guiding base 610 is provided with a limiting part 630 that protrudes toward the shock absorbing mechanism 500. The limiting part 630 is located between the two guiding plates 620, and the second elastic deformation part 530 of the shock absorbing mechanism 500 abuts against the limiting part 630 along a radial direction of the cutting frame 210, which prevents the cutting frame 210 from shaking in the radial direction and avoids noise caused by the shaking.

In a specific embodiment of the disclosure, the second elastic deformation part 530 may also be directly abutted on the guiding base 610 along the radial direction of the cutting frame 210, which means that the second elastic deformation part 530 is directly elastically abutted with a bottom of the guiding groove 640, so as to prevent the cutting frame 210 from shaking in the radial direction and avoids the noise caused by shaking.

Please refer to FIG. 26 through FIG. 28, FIG. 30 and FIG. 31. In some embodiments of the disclosure, the second elastic deformation part 530 includes two second elastic plates 531 that are arranged oppositely. A first end of the second elastic plate 531 is connected with the shock absorbing base 510, and a second end of the second elastic plate 531 is suspended and bent relative to the first end of the second elastic plate 531. A suspended end of the second elastic plate 531 abuts against the limiting part 630.

In some embodiments of the disclosure, bending directions of the two second elastic plates 531 are opposite to each other or opposite to a back of each other, and the two elastic plates are distributed symmetrically. Please refer to FIG. 30. In this embodiment, the bending directions of the two second elastic plates 531 are opposite to each other.

Figure 30:
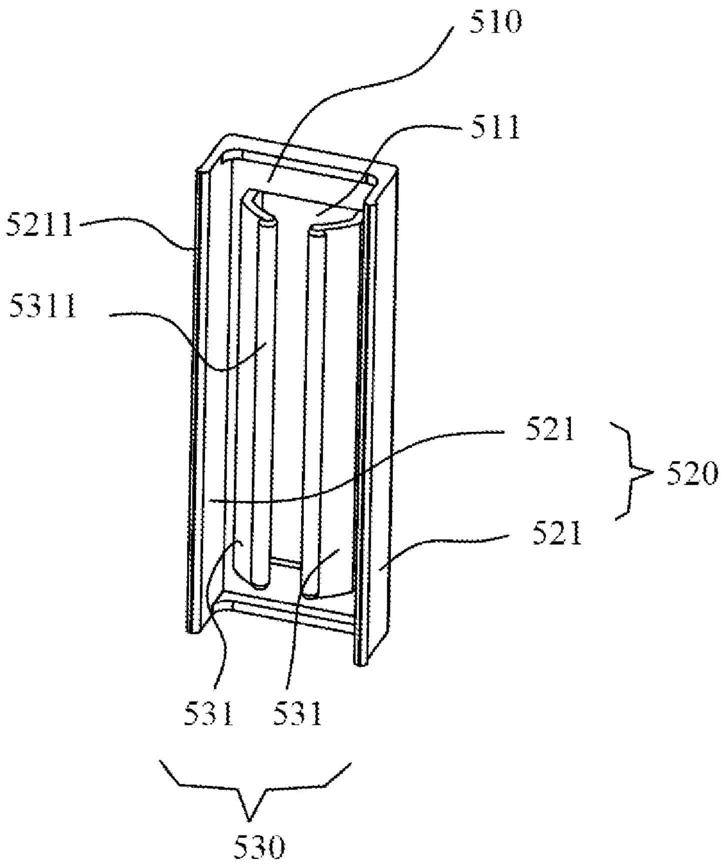
FIG. 30 is a schematic structural view of the shock absorbing mechanism according to at least one embodiment.

In some embodiments, please refer to FIG. 30. In a specific embodiment of the disclosure, the first end of the second elastic plate 531 is perpendicular to the shock absorbing base 510, and the second end of the second elastic plate 531 is bent in an arc shape.

Figure 27:
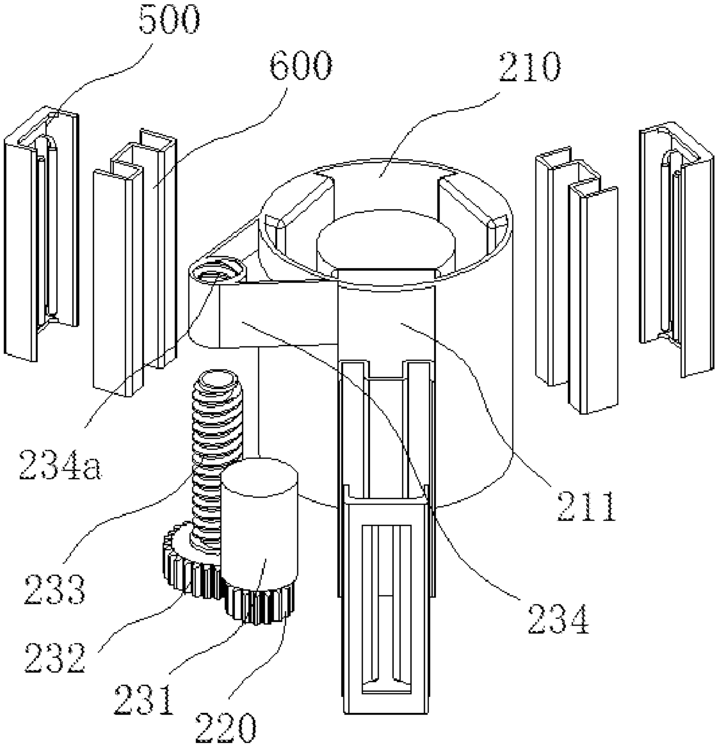
FIG. 27 is a schematic exploded view of the cutting frame, the shock absorbing mechanism, the guiding mechanism, the height adjustment mechanism of the mower according to a third embodiment.

In some embodiments, please refer to FIG. 27 and FIG. 30. In a specific embodiment of the disclosure, the shock absorbing base 510 is further provided with an opening groove 511 that penetrates through the shock absorbing base 510. The opening groove 511 is located between the first ends of two second elastic plates 531, and an arrangement of the opening groove 511 is conducive to improve a deformation capacity of the second elastic plate 531, so that the second elastic plate 531 is in an elastic contact with the limiting part 630. Wherein, the opening groove 511 may also be a blind groove, or in other embodiments, the opening groove 511 may also not be arranged.

In some embodiments, please refer to FIG. 26 through FIG. 28, FIG. 30 and FIG. 31. In a specific embodiment of the disclosure, the suspended end of the second elastic plate 531 is provided with a second protrusion 5311 protruding in a direction where the limiting part 630 is located, and the second protrusion 5311 is provided with an arc-shaped surface in contact with the limiting part 630. A protruding direction of the second protrusion 5311 is towards the limiting part 630, so that the arc-shaped surface of the second protrusion 5311 directly elastically abuts against the limiting part 630, which not only ensures a stability of the contact, avoids shaking caused by the gap, but also avoids causing damage to the limiting part 630 in the sliding process.

In some embodiments, please refer to FIG. 26 through FIG. 28, FIG. 30 and FIG. 31. In a specific embodiment of the disclosure, when the bending directions of the two second elastic plates 5314 are opposite, a gap is left between the two second protrusions 5311 to provide a space for an elastic deformation.

In some embodiments, please refer to FIG. 26 through FIG. 28, FIG. 30 and FIG. 31. In a specific embodiment of the disclosure, the second protrusion 5311 may be a cylinder, a semi-cylinder or a three-quarter cylinder, wherein the arc-shaped surface of the second protrusion 5311 is in an elastic contact with the limiting part 630. Wherein, a cross-sectional width of the second protrusion 5311 is greater than a cross-sectional width of the second end of the second elastic plate 531, which is conducive to ensure that the second protrusion 5311 is in contact with the limiting part 630, and avoids other parts of the second end of the second elastic plate 531 from contacting with the limiting part 630.

In some embodiments of the disclosure, a number of the second elastic plate 531 may also be one, two ends of the second elastic plate 531 are connected with the shock absorbing base 510, and a part between the two ends of the second elastic plate 531 arches in a direction away from the shock absorbing base 510, and can elastically abuts against the limiting part 630.

Please refer to FIG. 26 through FIG. 28, FIG. 30 and FIG. 31. In some embodiments of the disclosure, the limiting part 630 is formed by the guiding base 610 arching toward a direction of the shock absorbing mechanism 500.

In some embodiments of the disclosure, a cross-section of the limiting part 630 is U-shaped.

In some embodiments of the disclosure, the guiding mechanism 600 is mounted in the mounting groove 211, and the shock absorbing mechanism 500 is mounted on the base 110 of the casing 100. The guiding base 610 is provided with a first connecting part 650, and the first connecting part 650 is connected with the cutting frame 210 through fasteners. Wherein, fasteners may be screws or bolts.

Figure 32:
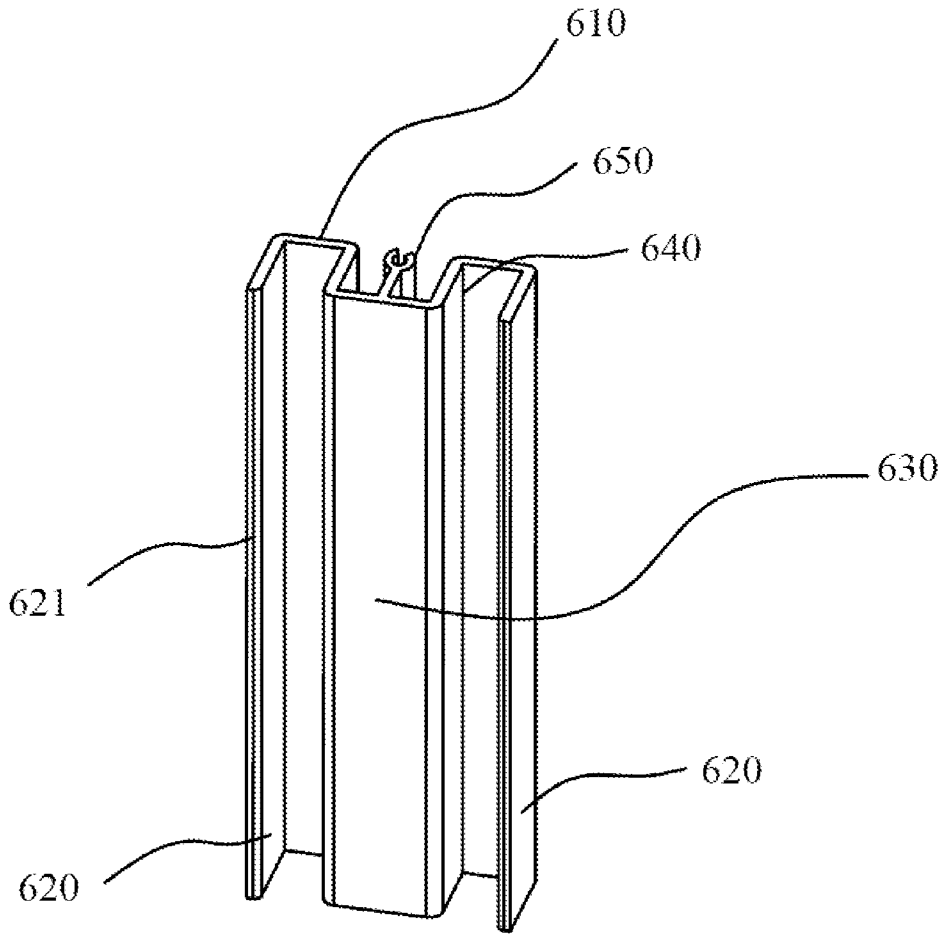
FIG. 32 is a schematic structural view of the guiding mechanism according to another embodiment of the disclosure.

Please refer to FIG. 26 and FIG. 32. In some embodiments of the disclosure, a first end of the first connecting part 650 is connected with one side of the guiding base 610 facing away from the shock absorbing mechanism 500, and a ring protrudes from the second end of the first connecting part 650. The ring may be a closed ring or an open ring with the opening 430*b*. In this embodiment, the ring is the open ring with the opening 430*b*, and when connected, the fastener is matched with the ring so that the guiding mechanism 600 is fixedly mounted on the cutting frame 210.

Please refer to FIG. 25 through FIG. 27 and FIG. 32. In some embodiments of the disclosure, the limiting part 630 is concave toward one side of the mounting groove 211 to form an accommodating space, and the first connecting part 650 may be arranged in the accommodating space. Wherein, the first connecting part 650 does not extend out of the accommodating space, which means that the first connecting part 650 does not abut against a bottom of the mounting groove 211. With this structural design, the guiding base 610 is directly attached to the bottom of the mounting groove 211, and an assembly is more stable and accurate. Moreover, the accommodating space penetrates through the guiding base 610 along a cutting height direction, so that the guiding mechanism 600 may elastically deform under a certain force, and the guiding mechanism 600 is more simple and convenient when being mounted into the mounting groove 211.

Please refer to FIG. 1 through FIG. 2, FIG. 25 through FIG. 32. In some embodiments of the disclosure, the guiding plate 620, the limiting part 630 and the guiding base 610 may be integrally formed.

Please refer to FIG. 2, FIG. 25 through FIG. 32. In a specific embodiment of the disclosure, the first elastic deformation part 520, the second elastic deformation part 530 and the shock absorbing base 510 may be integrally formed.

Please refer to FIG. 2, FIG. 26 through FIG. 28. In a specific embodiment of the disclosure, at least three groups of guiding mechanisms 600 are evenly arranged along a circumferential direction on the cutting frame 210, and the shock absorbing mechanism 500 corresponds to the guiding mechanism 600 one by one. Wherein, the shock absorbing mechanism 500 and the guiding mechanism 600 corresponding to and matched with each other are distributed along the radial direction of the cutting frame 210.

Figure 28:
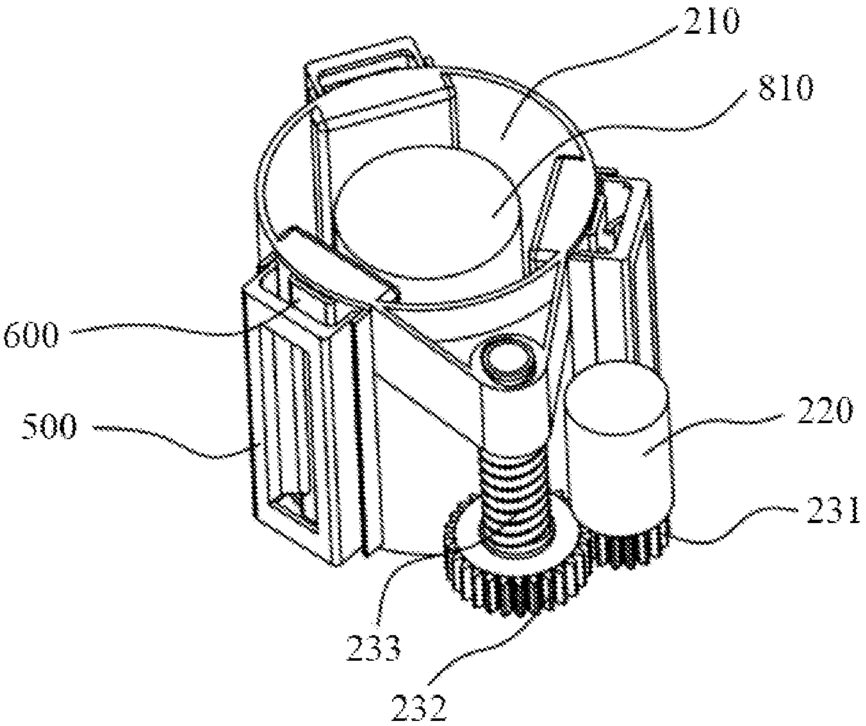
FIG. 28 is a schematic assembly view corresponding to FIG. 27.
Figure 29:
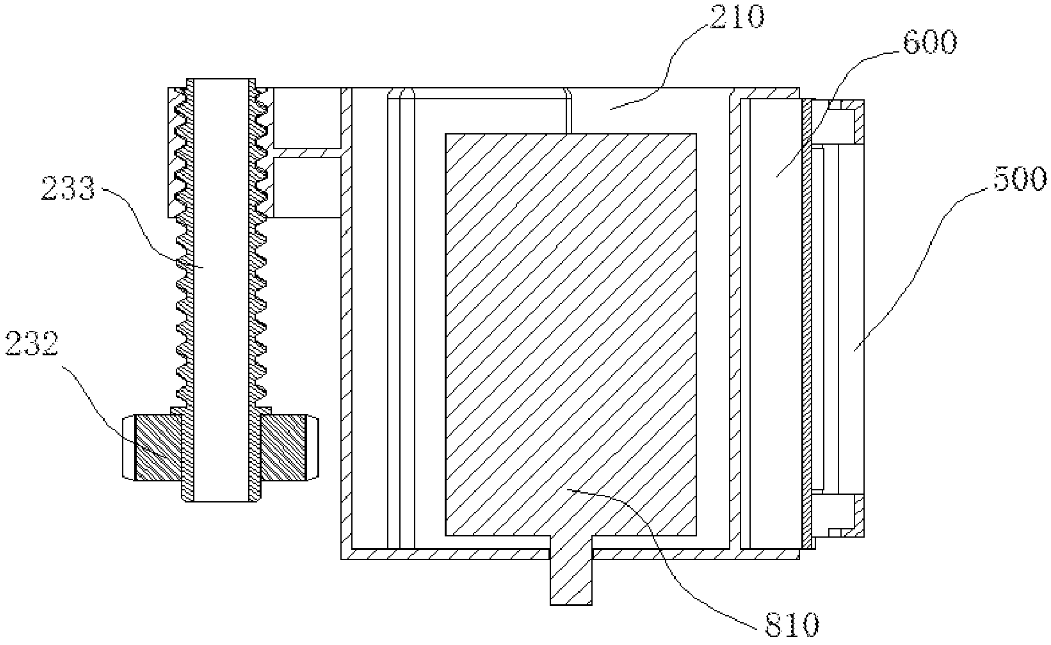
FIG. 29 is a cross-sectional view of FIG. 28.

Please refer to FIG. 28. In a specific embodiment of the disclosure, three groups of guiding mechanisms 600 and three groups of shock absorbing mechanisms 500 are arranged. The three groups of guiding mechanisms 600 are evenly distributed along a circumferential direction of cutting frame 210, and are mounted in mounting groove 211. The three groups of shock absorbing mechanisms 500 are also evenly distributed along the circumference of cutting frame 210, and are slidably matched with the guiding mechanism 600 one by one.

The following will illustrate the mower corresponding to the embodiments shown in FIG. 33 to FIG. 39.

In an embodiment, please refer to FIG. 33 through FIG. 39. The height adjustment mechanism includes the height adjustment motor 220, the cutting frame 210 and a height adjustment rotating drum 250. The height adjustment motor 220 is fixed on the casing 100. The cutting frame 210 is mounted in the sliding passage 131 of the casing 100, and the cutting device is arranged on the cutting frame 210 and moves along with the cutting frame 210. The height adjustment rotating drum 250 is connected with the height adjustment motor 220, and the height adjustment rotating drum 250 is sleeved with the cutting frame 210. Wherein, a spiral guiding structure that climbs along an axial spiral direction is arranged between the cutting frame 210 and the height adjustment rotating drum 250. When the height adjustment motor 220 drives the height adjustment rotating drum 250 to rotate in the first direction, the height adjustment rotating drum 250 drives the cutting rack 210 to slide axially along the sliding passage.

Moreover, when the height adjustment motor 220 drives the height adjustment rotating drum 250 to rotate in the first direction, after the cutting frame 210 slides and is lifted to exceed a highest position, the cutting frame 210 is lowered to a lowest position. When the height is adjusted, the height adjustment rotating drum 250 is controlled to rotate in the first direction all the time, and the height adjustment motor 220 can be adjusted to any position.

It should be noted that in the mower corresponding to the embodiments of FIG. 33 to FIG. 39, the sensing assembly and the height adjustment limiting structure are not shown, but the sensing assembly and the height adjustment limiting structure of the same principle are equally applicable in this mower.

Figure 33:
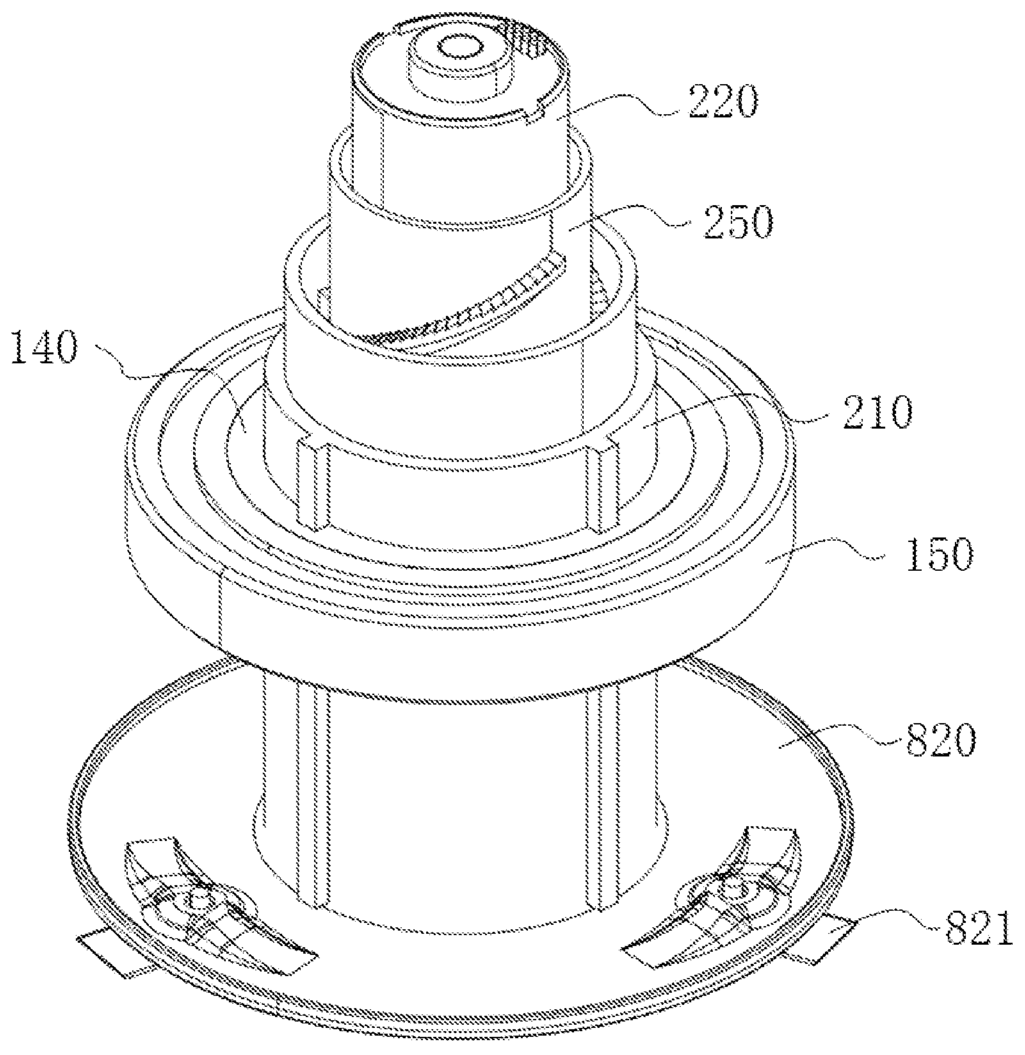
FIG. 33 is a schematic view of an assembly relationship of the height adjustment mechanism, a cutting disc and a casing of the mower according to another embodiment.
Figure 34:
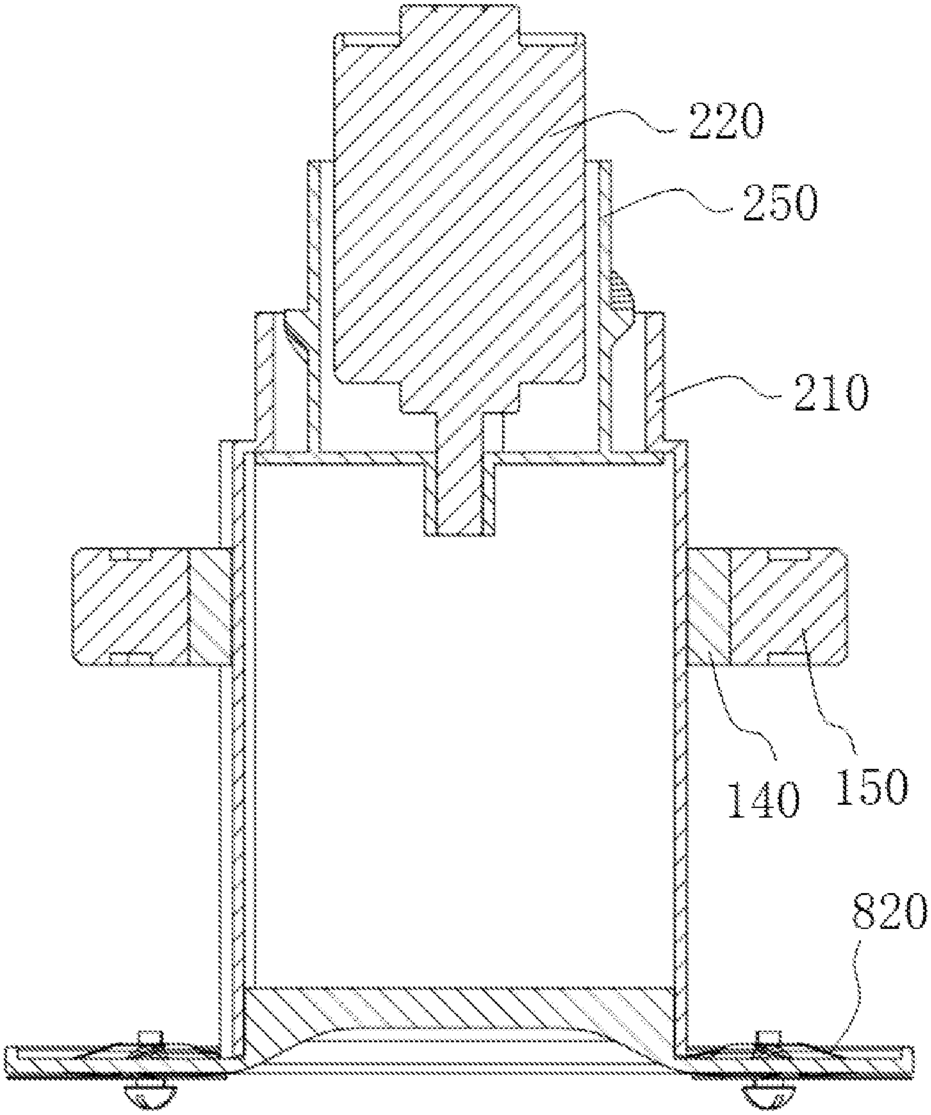
FIG. 34 is a cross-sectional view of FIG. 33.
Figure 37:
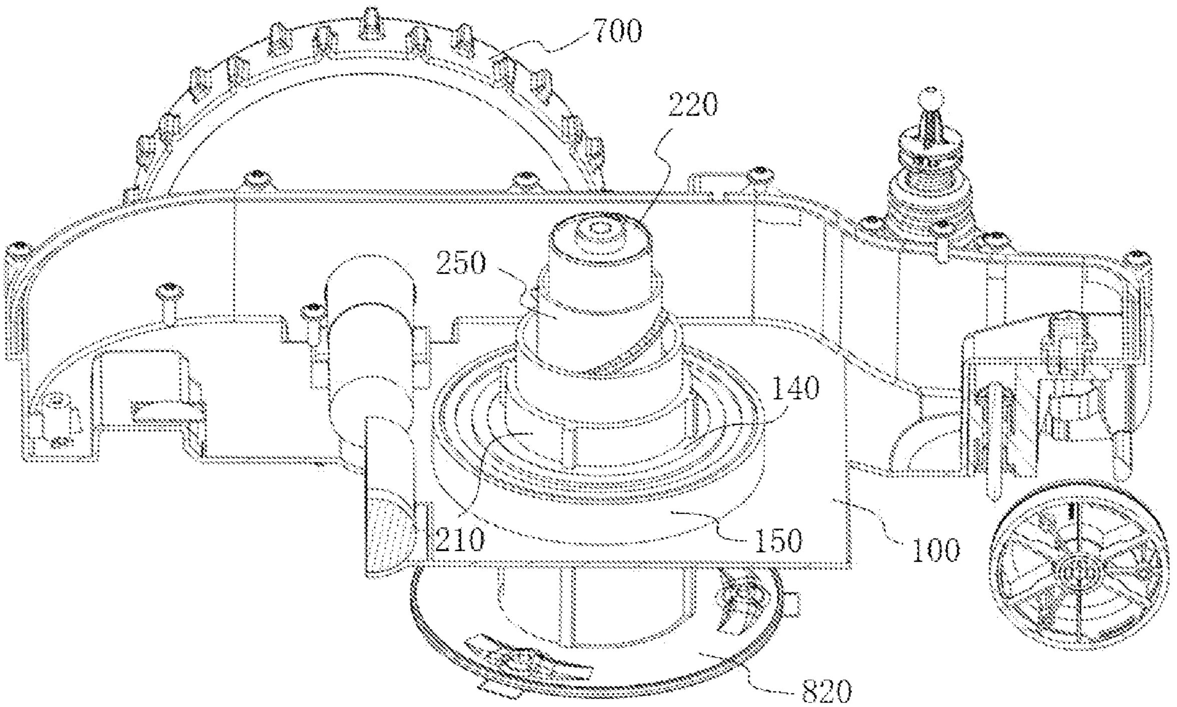
FIG. 37 is a schematic structural view of the guiding component in FIG. 33.
Figure 38:
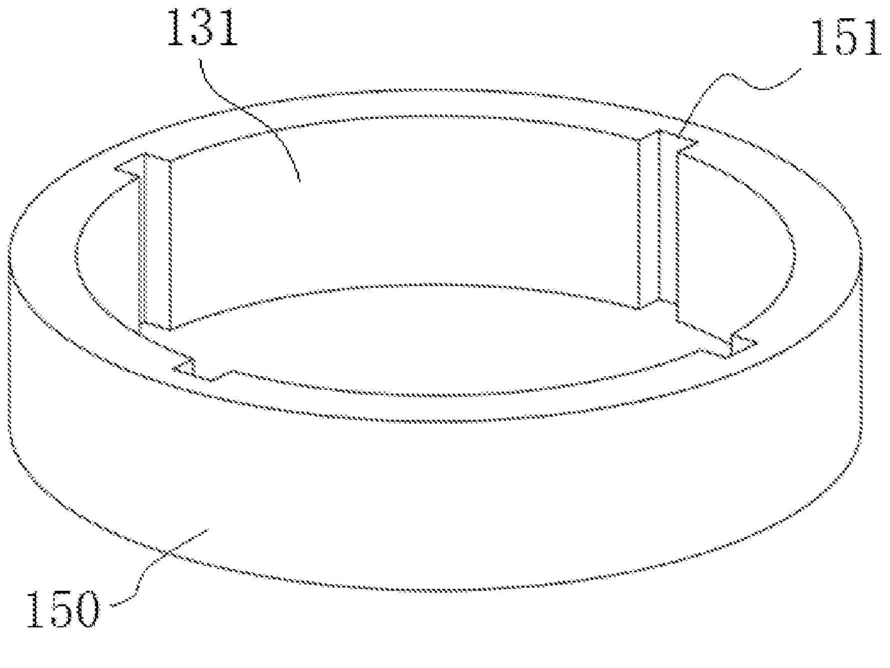
FIG. 38 is a partial schematic structural view of the mower with a structure of FIG. 33.

In FIG. 33, FIG. 34 and FIG. 37, the height adjustment motor 220 is directly connected with the height adjustment rotating drum 250. In an actual implementation process, the height adjustment motor 220 may also be indirectly connected with the height adjustment rotating drum 250 through a deceleration mechanism, and it may be considered whether to arrange the deceleration mechanism according to demands. The deceleration mechanism may adopt a gearbox to adjust an output rotating speed and a torque, so that power is transmitted to the height adjustment rotating drum 250 after a motor output speed is regulated.

Please refer to FIG. 33 through FIG. 37. In some embodiments, the casing 100 is provided with a guiding component 140, the sliding passage is formed inside the guiding component 140, and an anti-rotation guiding structure is arranged between the guiding component 140 and the height adjustment rotating drum 250. A one-way locking component 160 is further arranged between the guiding component 140 and the casing 100, and the one-way locking component 160 has an unlocking state and a locking state.

When the height adjustment rotating drum 250 rotates in the first direction, the one-way locking component 160 is in the locking state. The guiding component 140 is relatively fixed with the casing 100, and the cutting frame 210 slides axially along the sliding passage. When the height adjustment rotating drum 250 rotates in a second direction, the one-way locking component 160 is in the unlocking state, the guiding component 140 can rotate relative to the casing 100, and the cutting frame 210 and the guiding component 140 rotate with the cutting frame 210 simultaneously.

It should be noted that, the first direction is one of clockwise or counterclockwise, and the second direction is the other one of the clockwise and the counterclockwise. Through controlling a forward and reverse rotation of the height adjustment motor 220, a rotation of the height adjustment rotating drum 250 in the first direction or the second direction may be controlled.

With this structure, the one-way locking component 160 can limit a rotation of the guiding component 140 in the first direction, which enables the guiding component 140 to only rotate in the second direction. Since the cutting frame 210 and the guiding component 140 are rotated together, the cutting frame 210 is limited from rotating in the first direction, and the cutting frame 210 can only rotate in the second direction. With this structure, a cutting action and a height adjustment action share the same height adjustment motor 220, which means that controlling the height adjustment motor 220 to rotate in an opposite direction can realize a selection of the cutting action and the height adjustment action. This reduces product cost, saves a space occupied by height adjustment and mowing system, and has advantages of simple structure and convenient operation.

In some embodiments, the one-way locking component 160 includes an inner ring part and an outer ring part. The inner ring part is fixed with an outer wall of the guiding component 140, and the outer ring part is used for fixing on the casing 100. In an embodiment, the one-way locking component 160 may adopt a one-way bearing, an inner ring of the one-way bearing is fixed with the guiding component 140, and an outer ring of the one-way bearing is used for fixing with the casing 100. This structure can prevent the guiding component 140 from rotating in the first direction, and allows the guiding component 140 to rotate in the second direction.

In a specific embodiment, please refer to FIG. 33 through FIG. 37. The spiral guiding structure includes ratchet teeth 252 arranged on the height adjustment rotating drum 250 and a pawl 2121 arranged on the cutting frame 210. The ratchet teeth 252 climbs spirally along an axial direction of the height adjustment rotating drum 250. The pawl 2121 is matched with the ratchet teeth 252. When the height adjustment motor 220 drives the height adjustment rotating drum 250 to rotate in the first direction, the pawl 2121 climbs along a spiral direction of the ratchet teeth 252 so that the cutting frame 210 is lifted along its axis. When the height adjustment motor 220 drives the height adjustment rotating drum 250 to rotate in the second direction, the pawl 2121 is buckled with the ratchet teeth 252 to enable the cutting frame 210 to rotate in the second direction. In this way, an interaction between the pawl 2121 and the ratchet teeth 252 may correspond to different needs, so that the cutting frame 210 may realize the height adjustment or a rotating cutting.

In some embodiments of the disclosure, when the pawl 2121 climbs to a top along the spiral direction of the ratchet teeth 252, the pawl 2121 disengages from the top of the ratchet teeth 252 and falls back to a bottom end of the ratchet teeth 252. This structure ensures that the cutting frame 210 may automatically return to an initial position after being adjusted to an extreme height. When adjustment is needed next time, the height adjustment may be repeated.

Figure 36:
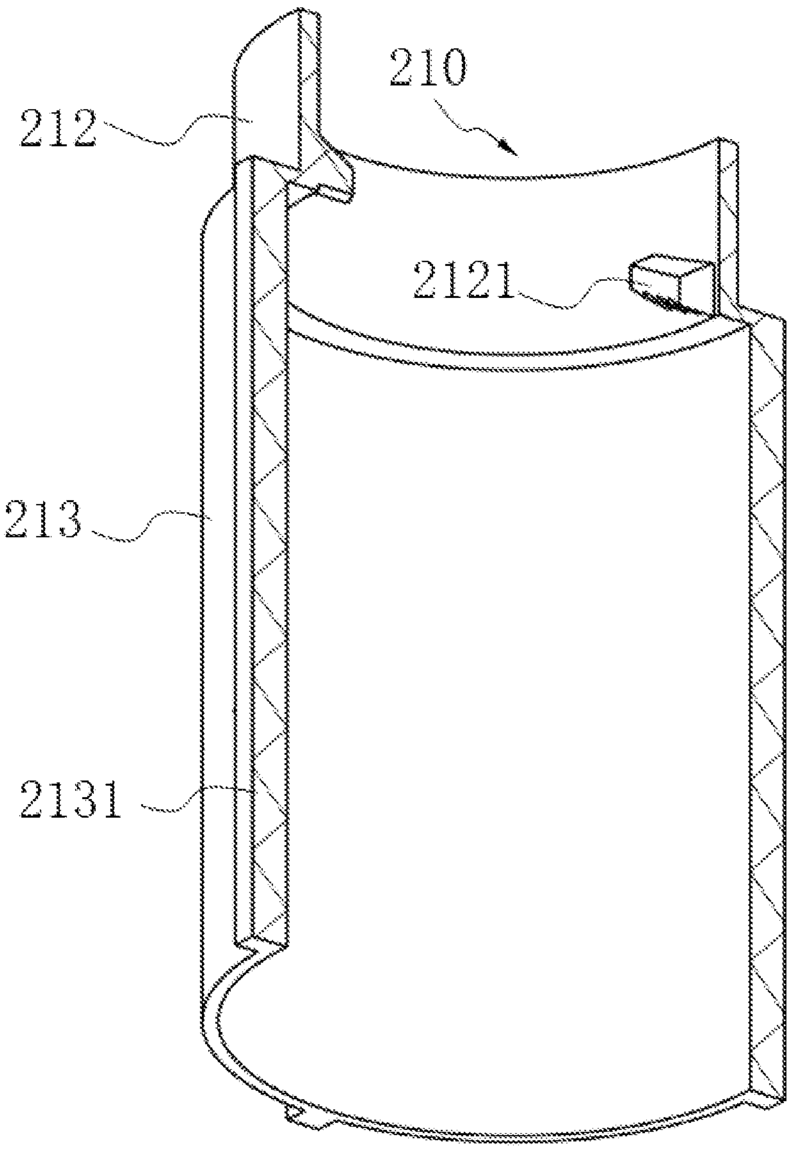
FIG. 36 is a schematic structural view of the cutting frame in FIG. 33.

In some embodiments of the disclosure, please refer to FIG. 36. The pawls 2121 are arranged on an inner wall of the cutting frame 210, and at least two pawls 2121 are arranged circumferentially along the inner wall of the cutting frame 210. In FIG. 36, two pawls 2121 are arranged circumferentially opposite to each other along the inner wall of the cutting frame 210. In this way, it may play a role of balance adjustment, ensure that the cutting frame 210 climbs smoothly with the pawl 2121, and ensure the stability and reliability of the height adjustment.

Please refer to FIG. 36 and FIG. 37. Since an anti-rotation guiding structure is arranged between the guiding component 140 and the cutting frame 210, the cutting frame 210 can only slide relative to the guiding component 140 and will not rotate relatively. In some embodiments, the anti-rotation guiding structure includes a limiting rib 2131 and a second limiting groove 141. The limiting rib 2131 is axially arranged on an outer wall of the cutting frame 210, the second limiting groove 141 is axially arranged on an inner wall of the guiding component 140, and the second limiting groove 141 is matched with the limiting rib 2131. With this structure, through arranging the limiting rib 2131 to be clamped in the second limiting groove 141, it is ensured that the cutting frame 210 can slide up and down along the second limiting groove 141 of the guiding component 140, and prevent a circumferential rotation between the cutting frame 210 and the guiding component 140 at the same time.

In some embodiments of the disclosure, a plurality of the limiting ribs 2131 is arranged along a circumferential direction of the cutting frame 210. A plurality of the second limiting grooves 141 is arranged along a circumferential direction of the guiding component 140, and the second limiting groove 141 corresponds to the limiting rib 2131 one by one. This structure ensures that the cutting frame 210 can maintain a smooth sliding process along the axial direction in the guiding component 140, thereby ensuring the stability and reliability of the height adjustment. In this embodiment, four limiting ribs 2131 are evenly arranged along the circumferential direction of the cutting frame 210 and four second limiting grooves 141 are evenly arranged along the circumferential direction of the guiding component 140.

In other embodiments, the limiting ribs 2131 can be arranged on the inner wall of the guiding component 140, and correspondingly, the second limiting grooves 141 can be arranged on the outer wall of the cutting frame 210. In other embodiments, as long as it can play a role of circumferential anti-rotation and axial guidance, the anti-rotation guiding structure may also be set to other structures.

Figure 35:
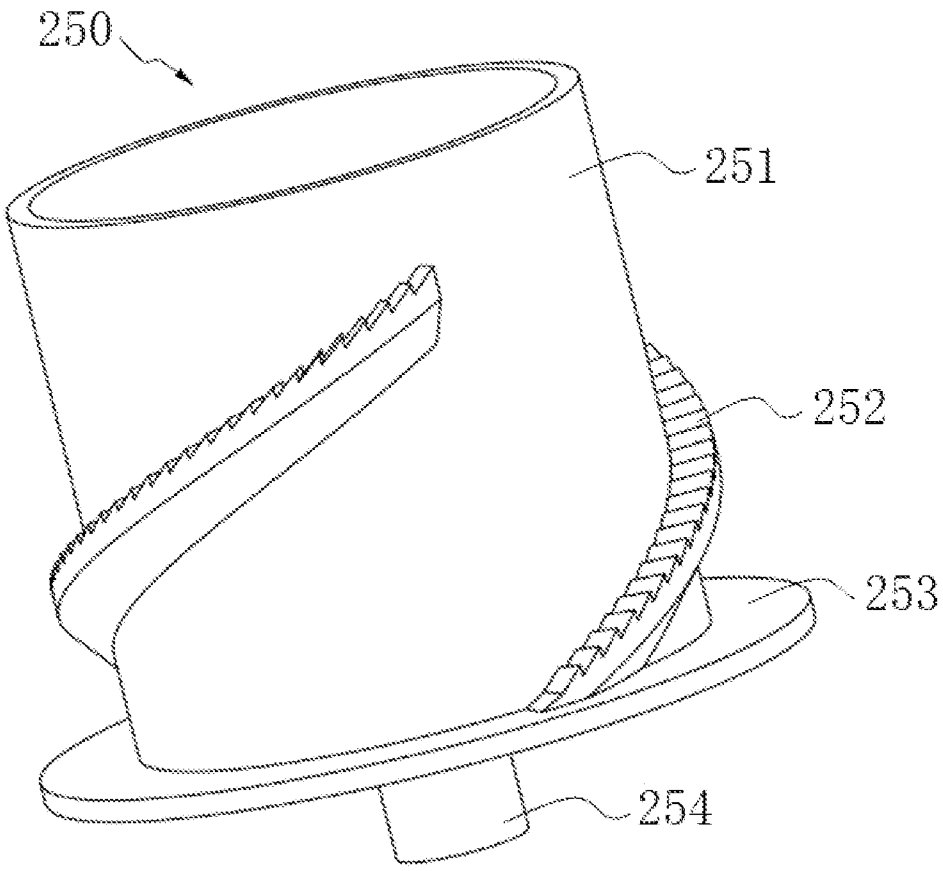
FIG. 35 is a schematic structural view of a height adjustment rotating drum in FIG. 33.

Please refer to FIG. 35. In some embodiments of the disclosure, the height adjustment rotating drum 250 include a drum body 251 and a limiting disc 253. An interior of the drum body 251 is hollow, and the ratchet teeth 252 are arranged on an outer wall of the drum body 251. The limiting disc 253 is connected with a tail end of the drum body 251. An outer diameter of the limiting disc 253 is greater than an outer diameter of the drum body 251, and a tail end of the ratchet teeth 252 extends to the limiting disc 253. In an embodiment, a top end of the drum body 251 is open so that the height adjustment motor 220 can be placed in the drum body 251. The limiting disc 253 at the tail end of the drum body 251 is used for limiting an axial position of the cutting frame 210.

In some embodiments of the disclosure, a bottom of the limiting disc 253 is provided with a second connecting part 254 for connecting the height adjustment motor 220, the height adjustment motor 220 is arranged in the height adjustment rotating drum 250, and an output shaft of the height adjustment motor 220 is connected to the second connecting part 254. In an embodiment, the second connecting part 254 is a cylindrical structure. A connecting hole is formed in the second connecting part 254 along its axial direction, and the output shaft of the height adjustment motor 220 is mounted in the connecting hole. In this way, a mounting space may be provided for the height adjustment motor 220 without occupying external space.

Please refer to FIG. 36. In some embodiments of the disclosure, an interior of the cutting frame 210 is hollow for placing the height adjustment rotating drum 250. The cutting frame 210 includes a first shaft section 212 and a second shaft section 213, and the pawl 2121 is arranged on an inner wall of the first shaft section 212. The second shaft section 213 is connected with an end of the first shaft section 212, and a diameter of the second shaft section 213 is greater than a diameter of the first shaft section 212. There is a limiting step between the second shaft section 213 and the first shaft section 212, and the limiting disc 253 of the height adjustment rotating drum 250 is matched with the limiting step. In an embodiment, the first shaft section 212 and the second shaft section 213 are integrally formed, and when the cutting frame 210 is assembled with the height adjustment rotating drum 250, the limiting step and the limiting disc 253 may play a role of axial limiting, so that the axial position when the cutting frame 210 is lowered to the initial position is ensured. Moreover, the pawl 2121 is close to the limiting step. When at the initial position, the pawl 2121 starts to climb from a bottom end of the ratchet teeth 252. The limiting rib 2131 is arranged on an outer wall of the second shaft section 213, and the second shaft section 213 slides back and forth in the guiding component 140.

In some embodiments of the disclosure, the cutting disc 820 is a cutting deck, the cutting deck is connected with a bottom of the cutting frame 210, and a plurality of cutting blades 821 are arranged along a circumferential direction on the cutting deck. In this embodiment, three cutting blades 821 are evenly distributed along an axial direction on the cutting deck, and a head part of the cutting blade 821 protrudes from an outer edge of the cutting deck. A movement of the cutting deck is driven by the height adjustment motor 220, and the cutting operation is realized. Since the cutting frame 210 is connected with the cutting deck, a distance from the ground of the cutting deck may be adjusted by adjusting a height of the cutting frame 210.

Please refer to FIG. 33 through FIG. 39. A specific operation process of the mower corresponding to the embodiment is as follows. When the height adjustment is required, the height adjustment motor 220 is controlled to drive the height adjustment rotating drum 250 to rotate in the first direction, the one-way locking component 160 is locked at this moment, and may prevent the guiding component 140 and the cutting frame 210 from rotating in the first direction, so that the pawl 2121 climbs along the spiral direction of the ratchet teeth 252. The anti-rotation guiding structure between the cutting frame 210 and the guiding component 140 enables the cutting frame 210 and the guiding component 140 to only be capable of sliding axially without relative rotation, so that the cutting frame 210 is lifted together with the pawl 2121, which realizes a height adjustment function. When cutting operation is required, the height adjustment motor 220 is controlled to drive height adjustment rotating drum 250 to rotate in the second direction, and the second direction is reversed with the first direction. At this moment, the pawl 2121 is buckled with the ratchet teeth 252, and the two have no relative movement. And since the one-way locking component 160 is in the unlocking state at this moment, the cutting frame 210 is rotated together with the height adjustment rotating drum. The rotation power of the height adjustment motor 220 is transmitted to the cutting disc 820, so that a cutting system operates normally, which realizes a cutting function.

According to different needs of the user, the mower of this structure controls the height adjustment and the cutting according to different working conditions through the control unit. When the height adjustment is performed, the height adjustment motor 220 is controlled to drive the height adjustment rotating drum 250 to rotate in the first direction, so that the cutting frame 210 is lifted along its axis. When the cutting is performed, the height adjustment motor 220 is controlled to drive the height adjustment rotating drum 250 to rotate in the second direction, so that the cutting frame 210 rotates in the second direction. This may be achieved by a remote control or through a device's own electronic control panel.

Figure 40:
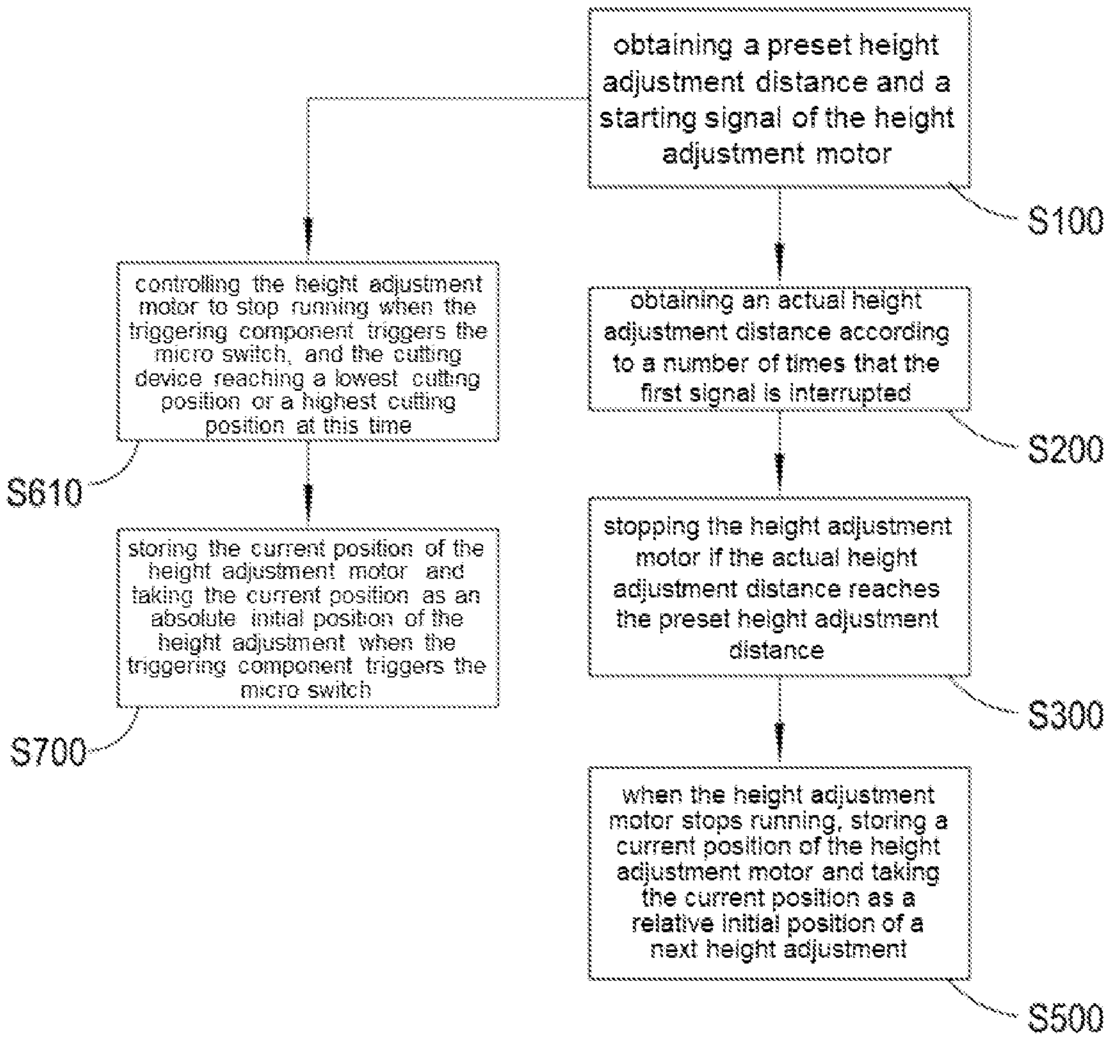
FIG. 40 is a flowchart of a height adjustment method according to at least one embodiment.
Figure 41:
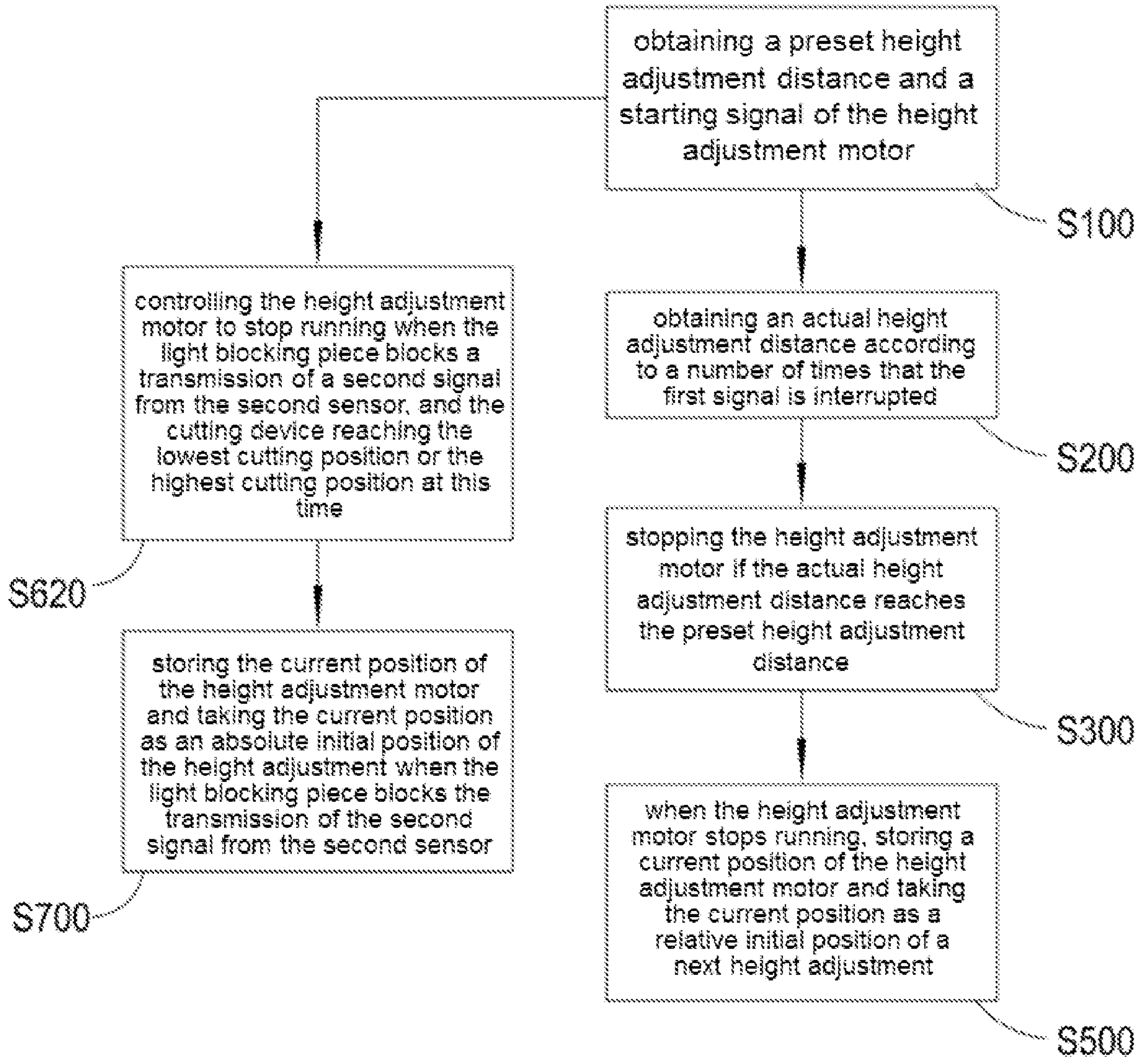
FIG. 41 is a flowchart of the height adjustment method according to another embodiment.

Correspondingly, the disclosure provides a height adjustment method of the mower. Please refer to FIG. 1 through FIG. 8. The mower is the mower that is provided with the height adjustment motor 220 and the sensing assembly 300 in any of the above-mentioned embodiments. and please refer to FIGS. 40 and 41, the height adjustment method includes:

- S100: inputting a preset height adjustment distance and a starting signal of the height adjustment motor 220;
- S200, controlling the first signal receiver 321 to continuously receive a first signal, and obtaining an actual height adjustment distance according to a number of times that the first signal is interrupted;
- S300, controlling the height adjustment motor 220 to stop running if the actual height adjustment distance reaches the preset height adjustment 220 distance, if not, controlling the height adjustment motor 220 to continue to run.

In some embodiments of the disclosure, the height adjustment method further includes S500: when the height adjustment motor stops running, storing a current position of the height adjustment motor 220 and taking the current position as a relative initial position of a next height adjustment.

In some embodiments of the disclosure, the disclosure provides the height adjustment method suitable for the above-mentioned mower provided with the micro switch 410 and the triggering component 420, and the height adjustment method further includes S610: controlling the height adjustment motor 220 to stop running when the triggering component 420 triggers the micro switch 410, and the cutting device reaching a lowest cutting position or a highest cutting position at this time.

In some embodiments of the disclosure, the disclosure provides the height adjustment method suitable for the above-mentioned mower provided with the light blocking piece 440 and the second sensor 450, and the height adjustment method further includes S620: controlling the height adjustment motor to stop running when the light blocking piece 440 blocks a transmission of a second signal from the second sensor 450, and the cutting device reaching the lowest cutting position or the highest cutting position at this time. Wherein, the second sensor is a photoelectric gate sensor.

In some embodiments of the disclosure, the height adjustment method further includes S700: storing the current position of the height adjustment motor 220 and taking the current position as an absolute initial position of the height adjustment when the triggering component 420 triggers the micro switch 410 or when the light blocking piece 440 blocks the transmission of the second signal from the second sensor 450.

In some embodiments of the disclosure, the height adjustment method further includes: when each time the height is adjusted, after the motor 220 is started, first controlling the height adjustment motor 220 to run, enabling the triggering component 420 to trigger the micro switch 410 or enabling the light blocking piece 440 to block the transmission of the second signal from the second sensor 450, stopping the height adjustment motor 220 from running, keeping the current position as the absolute initial position, then taking the absolute initial position as a base point, starting measuring the number of times the first signal receiver 321 is interrupted in receiving the first signal, and obtaining the actual height adjustment distance.

In summary, the disclosure determines the actual height adjustment distance by the number of signal interruptions received by the first signal receiver 321. When the actual height adjustment distance reaches the preset height adjustment distance, the height adjustment motor 220 is controlled to stop running, which does not need manual height-leveling and is conducive to realizing the remote control. The height adjustment limiting structure 400 is used to protect the height adjustment motor 220, thereby improving a reliability and safety of the height adjustment.

The above embodiments only illustrate principles and effects of the disclosure, but are not intended to limit the disclosure. Anyone familiar with this technology may modify or change the above embodiments without departing from a scope of the disclosure. Therefore, all equivalent modifications or changes made by those with ordinary knowledge in the technical field without departing from the technical ideas disclosed in the disclosure shall still be covered by the claims of the disclosure.

What is claimed is:

1. A mower, comprising:

a casing;

a cutting device, arranged on the casing and provided with a cutting disc;

a height adjustment mechanism driving the cutting device to move along a height adjustment direction relative to the casing;

a sensing assembly, configured to detect a height adjustment distance of the cutting device relative to the casing in the height adjustment direction, including a corresponding optical grating structure and a first sensor, the optical grating structure including hollow parts and blocking parts distributed alternately, the first sensor including a first signal receiver and a first signal transmitter, and a first signal between the first signal transmitter and the first signal receiver being periodically blocked during height adjustment; and a control unit, configured to control the height adjustment mechanism to adjust a height according to a number of times the first signal being blocked;

wherein one of the optical grating structure and the first sensor is directly or indirectly arranged on the cutting device, and the other one of the optical grating structure and the first sensor is directly or indirectly arranged on the casing;

wherein the height adjustment mechanism further comprises:

a cutting frame, the cutting device being arranged on the cutting frame and provided with a cutting motor to drive the cutting disc to perform a cutting, and the cutting frame being mounted in a sliding passage of the casing;

a height adjustment motor, fixedly connected with the casing; and a transmission structure, connecting the height adjustment motor with the cutting frame, configured to convert a rotation motion output by the height adjustment motor into a linear motion of the cutting frame along the sliding passage, and the height adjustment motor driving the cutting frame to adjust the height;

wherein one of the optical grating structure and the first sensor is arranged on the cutting frame.

2. The mower according to claim 1, wherein, the optical grating structure is strip-shaped, and each hollow part and each blocking part of the optical grating structure are alternately arranged along the height adjustment direction, wherein the optical grating structure is arranged on the cutting frame, and the first sensor is arranged on the casing.

3. The mower according to claim 1, wherein the optical grating structure is strip-shaped, and each hollow part and each blocking part of the optical grating structure are alternately arranged along the height adjustment direction, wherein, the optical grating structure is arranged on the casing, and the first sensor is arranged on the cutting frame.

4. The mower according to claim 3, wherein there are two first sensors arranged along a length direction of the optical grating structure.

5. The mower according to claim 3, wherein the hollow parts and the plurality of blocking parts in the optical grating structure have a same size.

6. The mower according to claim 1, wherein, the optical grating structure is disc-shaped, the optical grating structure is connected with the height adjustment motor and rotates with the height adjustment motor, and each hollow part and each blocking part of the optical grating structure are alternately, evenly and circumferentially distributed on the optical grating structure.

7. The mower according to claim 1, wherein, the height adjustment mechanism is further correspondingly provided with a height adjustment limiting structure configured to limit a minimum cutting height and a highest cutting height of the cutting device.

8. The mower according to claim 7, wherein, the height adjustment limiting structure comprises a light blocking piece and a second sensor, the light blocking piece comprises an intercepting portion located at the highest cutting height, an intercepting portion located at the lowest cutting height and a hollow portion located between the two intercepting portions, and the intercepting portion is configured to block a signal of the second sensor;

one of the light blocking piece and the second sensor is arranged on the cutting frame, and one of the light blocking piece and the second sensor is arranged on the casing.

9. The mower according to claim 7, wherein, the height adjustment limiting structure comprises a micro switch and a triggering component to trigger the micro switch, wherein, one of the micro switch and the triggering component is arranged on the cutting frame, and one of the micro switch and the triggering component is arranged on the casing;

the triggering component is configured to trigger the micro switch to stop the height adjustment motor when the cutting frame is adjusted to a highest distance from the ground or a lowest distance from the ground.

10. The mower according to claim 1, further comprising:

a shock absorbing mechanism, comprising a shock absorbing base, a first elastic deformation part arranged on the shock absorbing mechanism and a second elastic deformation part arranged on the shock absorbing mechanism; and a guiding mechanism, connected with the shock absorbing mechanism, the guiding mechanism and the shock absorbing mechanism being capable of sliding relative along the height adjustment direction of the cutting frame, one of the shock absorbing mechanism and the guiding mechanism being arranged on the cutting frame, and the other one of the shock absorbing mechanism and the guiding mechanism being arranged on the casing;

wherein, the first elastic deformation part is elastically abutted against the guiding mechanism to limit a swing and tilt of the cutting frame relative to the height adjustment direction, and the second elastic deformation part is elastically abutted against the guiding mechanism to limit a shaking of the cutting frame in a radial direction.

11. The mower according to claim 1, wherein, the transmission structure further comprises:

a transmission rod, capable of being driven by the height adjustment motor to rotate; and a transmission part, arranged on the cutting frame and provided with a screw hole;

wherein, the transmission rod penetrates through the screw hole, and is threaded with the screw hole.

12. The mower according to claim 11, wherein, the transmission structure further comprises:

a driving gear, connected with the height adjustment motor; and a driven gear, coaxially fixed with the transmission rod;

wherein, the driven gear meshed with the driving gear.

13. A height adjustment method of a mower, comprising:

obtaining a preset height adjustment distance and a starting signal of a height adjustment motor;

controlling a first signal receiver to continuously receive a first signal, and obtaining an actual height adjustment distance according to a number of times that the first signal is interrupted;

stopping the height adjustment motor if the actual height adjustment distance reaches the preset height adjustment distance;

wherein the method further comprises:

controlling the height adjustment motor to stop running when a triggering component triggers a micro switch, and a cutting device reaching a lowest cutting position or a highest cutting position at this time.

14. The height adjustment method according to claim 13, further comprising: storing a current position of the height adjustment motor and taking the current position as a relative initial position of a next height adjustment when the height adjustment motor stops running.

15. The height adjustment method according to claim 13, further comprising:

controlling the height adjustment motor to stop running when a light blocking piece blocks a transmission of a second signal from the second sensor, the cutting device reaching the lowest cutting position or the highest cutting position at this time, wherein, the second sensor is a photoelectric gate sensor.

16. The height adjustment method according to claim 15, further comprising:

storing the current position of the height adjustment motor and taking the current position as an absolute initial position of the height adjustment when the triggering component triggers the micro switch or when the light blocking piece blocks the transmission of the second signal from the second sensor.

17. The height adjustment method according to claim 15, further comprising: each time a height is adjusted, after the height adjustment motor is started, first controlling the height adjustment motor to run, enabling the triggering component to trigger the micro switch or enabling the light blocking piece to block the transmission of the second signal from the second sensor, stopping the height adjustment motor from running, and keeping the current position as an absolute initial position;

then taking the absolute initial position as a base point, starting measuring the number of times the first signal receiver is interrupted in receiving the first signal, and obtaining the actual height adjustment distance.

18. A mower, comprising:

a casing;

a cutting device arranged on the casing;

a height adjustment mechanism driving the cutting device to move along a height adjustment direction relative to the casing;

a sensing assembly configured to detect a height adjustment distance, including an optical grating structure including hollow parts and blocking parts distributed alternately, and a first sensor including a first signal receiver and a first signal transmitter; and a control unit configured to control the height adjustment mechanism;

wherein a first signal is sent by the first signal transmitter and received by the first signal receiver, the first signal is periodically blocked by the optical grating structure during height adjustment;

wherein the height adjustment mechanism further comprises:

a cutting frame, the cutting device being arranged on the cutting frame and provided with a cutting motor to drive a cutting disc to perform a cutting, and the cutting frame being mounted in a sliding passage of the casing;

a height adjustment motor, fixedly connected with the casing; and a transmission structure, connecting the height adjustment motor with the cutting frame, configured to convert a rotation motion output by the height adjustment motor into a linear motion of the cutting frame along the sliding passage, and the height adjustment motor driving the cutting frame to adjust the height;

wherein one of the optical grating structure and the first sensor is arranged on the cutting frame.

* * * * *